(12) United States Patent
Lee et al.

(10) Patent No.: US 11,960,310 B2
(45) Date of Patent: Apr. 16, 2024

(54) POWER SUPPLY METHOD USING A PLURALITY OF VOLTAGE SOURCES AND ELECTRONIC DEVICE USING THE SAME

(71) Applicant: SAMSUNG ELECTRONICS CO., LTD., Suwon-si (KR)

(72) Inventors: Dongyeol Lee, Seoul (KR); Dongwook Suh, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 114 days.

(21) Appl. No.: 17/369,185

(22) Filed: Jul. 7, 2021

(65) Prior Publication Data

US 2022/0083085 A1    Mar. 17, 2022

(30) Foreign Application Priority Data

Sep. 17, 2020   (KR) .................. 10-2020-0120037

(51) Int. Cl.
*G05F 1/575*   (2006.01)
*G05F 1/10*   (2006.01)
(Continued)

(52) U.S. Cl.
CPC ............... *G05F 1/563* (2013.01); *G05F 1/10* (2013.01); *G05F 1/575* (2013.01); *G06F 1/263* (2013.01)

(58) Field of Classification Search
CPC .......... H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048; G05F 1/462;
(Continued)

(56) References Cited

U.S. PATENT DOCUMENTS 4,513,207 A * 4/1985 Bloomer .................. G05B 1/02
327/83
5,519,309 A * 5/1996 Smith ..................... G05F 1/561
327/103
(Continued)

FOREIGN PATENT DOCUMENTS

DE  112018003004  *  3/2020
EP      0316781   *  11/1988
(Continued)

*Primary Examiner* — Thienvu V Tran
*Assistant Examiner* — Nusrat Quddus
(74) *Attorney, Agent, or Firm* — Sughrue Mion, PLLC

(57) ABSTRACT

An electronic device includes a power management device configured to supply a plurality of input voltages; a power module configured to generate an output voltage using at least one of the plurality of input voltages, and to output the generated output voltage; and a system load configured to operate by receiving the output voltage, wherein the power module includes: a first power module configured to receive a first input voltage from the power management device, and to generate a first output current using the first input voltage; and a second power module configured to receive a second input voltage from the power management device, and to generate a second output current using the second input voltage based on the first input voltage being lower than a first reference voltage.

20 Claims, 17 Drawing Sheets

(51) Int. Cl.
*G05F 1/563* (2006.01)
*G06F 1/26* (2006.01)

(58) Field of Classification Search
CPC . G05F 1/465; G05F 1/468; G05F 1/56; G05F 1/575; G05F 1/562; G05F 1/565; G05F 1/567; G05F 1/569; G05F 1/571; G05F 1/573; G05F 1/5735
See application file for complete search history.

(56) References Cited

U.S. PATENT DOCUMENTS

| | | | | |
|---|---|---|---|---|
| 6,091,287 A * | 7/2000 | Salter | G05F 1/465 | 327/539 |
| 6,177,783 B1 * | 1/2001 | Donohue | H02J 1/102 | 323/272 |
| 6,278,421 B1 * | 8/2001 | Ishida | G09G 3/2944 | 345/63 |
| 7,282,899 B1 * | 10/2007 | Daun-Lindberg | H02J 1/001 | 323/272 |
| 7,466,573 B2 * | 12/2008 | Kojori | H02J 1/10 | 363/65 |
| 8,022,681 B2 * | 9/2011 | Gurcan | G05F 1/565 | 323/283 |
| 8,373,396 B2 * | 2/2013 | Huang | G05F 1/56 | 323/270 |
| 8,476,965 B2 * | 7/2013 | Santo | G05F 1/561 | 327/427 |
| 8,508,297 B2 * | 8/2013 | Honda | H03F 1/0222 | 330/297 |
| 8,635,470 B1 | 1/2014 | Kraipak et al. | | |
| 8,810,217 B2 * | 8/2014 | Malmberg | H02J 3/46 | 323/272 |
| 9,213,347 B2 | 12/2015 | Kim et al. | | |
| 9,413,240 B2 * | 8/2016 | Mansri | G05F 3/08 | |
| 9,547,027 B2 | 1/2017 | Varma et al. | | |
| 9,577,532 B2 * | 2/2017 | Tournatory | H02M 3/1584 | |
| 9,766,678 B2 | 9/2017 | Muthukaruppan et al. | | |
| 9,886,048 B2 * | 2/2018 | Du | G05F 1/575 | |
| 10,088,857 B1 * | 10/2018 | Zhang | G05F 1/575 | |
| 10,103,630 B1 * | 10/2018 | van Dijk | H02M 3/156 | |
| 10,108,212 B2 * | 10/2018 | Park | G05F 1/59 | |
| 10,153,710 B1 * | 12/2018 | Barbosa | H02M 7/23 | |
| 10,170,994 B1 * | 1/2019 | Gibney | H02M 3/156 | |
| 10,205,388 B2 * | 2/2019 | Choi | G01R 19/0092 | |
| 10,291,053 B1 * | 5/2019 | Ho | H02J 7/00718 | |
| 10,389,224 B2 * | 8/2019 | Huang | H02M 3/156 | |
| 10,649,513 B2 * | 5/2020 | Wang | G06F 13/122 | |
| 10,678,280 B2 * | 6/2020 | Cho | G05F 1/56 | |
| 10,763,747 B2 * | 9/2020 | Turcan | H02M 3/156 | |
| 11,128,132 B2 * | 9/2021 | Wilson | H02J 1/102 | |
| 11,393,395 B2 * | 7/2022 | Kim | G09G 3/3233 | |
| 11,538,387 B1 * | 12/2022 | Lee | G09G 3/20 | |
| 2007/0279031 A1 * | 12/2007 | Takeyama | G05F 1/465 | 323/314 |
| 2008/0024187 A1 * | 1/2008 | Walker | H03K 19/018521 | 327/322 |
| 2009/0153122 A1 * | 6/2009 | Kawagishi | G05F 1/56 | 323/284 |
| 2010/0060078 A1 | 3/2010 | Shaw | | |
| 2010/0164289 A1 * | 7/2010 | Umminger | G05F 1/565 | 307/55 |
| 2010/0277140 A1 * | 11/2010 | Liu | H02J 1/10 | 290/1 R |
| 2011/0175585 A1 * | 7/2011 | Huang | G06F 1/26 | 323/282 |
| 2011/0260783 A1 * | 10/2011 | Kawasaki | G06F 1/324 | 327/540 |
| 2012/0044273 A1 * | 2/2012 | Park | G09G 3/3208 | 345/211 |
| 2012/0153723 A1 * | 6/2012 | Van Dijk | G05F 1/56 | 307/31 |
| 2013/0181519 A1 * | 7/2013 | Lee | H02J 3/46 | 307/24 |
| 2013/0193941 A1 * | 8/2013 | DeFazio | G05F 1/46 | 323/282 |
| 2013/0200728 A1 * | 8/2013 | Liu | G06F 1/26 | 307/130 |
| 2014/0035596 A1 * | 2/2014 | Lee | G06F 1/28 | 324/522 |
| 2014/0111175 A1 * | 4/2014 | Noh | G06F 1/263 | 323/282 |
| 2014/0277812 A1 | 9/2014 | Shih et al. | | |
| 2015/0265002 A1 * | 9/2015 | Langvin | F16K 11/076 | 36/29 |
| 2015/0340949 A1 * | 11/2015 | Holmberg | H02M 3/158 | 323/271 |
| 2016/0018462 A1 * | 1/2016 | Menon | G01R 31/40 | 714/731 |
| 2016/0265983 A1 * | 9/2016 | Hsu | G05F 3/225 |  |
| 2016/0306374 A1 * | 10/2016 | Ghayal | G05F 1/59 | |
| 2016/0379581 A1 * | 12/2016 | Takenaka | H02M 3/156 | 345/212 |
| 2017/0063140 A1 * | 3/2017 | Lee | H02J 7/04 | |
| 2017/0110979 A1 * | 4/2017 | Chang | G05F 1/563 | |
| 2017/0185094 A1 * | 6/2017 | Atkinson | G06F 1/3243 | |
| 2017/0236488 A1 * | 8/2017 | Suzuki | H02M 3/157 | 345/212 |
| 2017/0255213 A1 * | 9/2017 | Oikarinen | G06F 1/26 | |
| 2018/0196455 A1 * | 7/2018 | Lee | G05F 1/575 | |
| 2019/0197874 A1 * | 6/2019 | Scheer | G08B 25/006 | |
| 2020/0119648 A1 * | 4/2020 | Lee | H02M 1/08 | |
| 2020/0348707 A1 * | 11/2020 | Lee | G05F 1/575 | |
| 2020/0357319 A1 * | 11/2020 | Xu | G09G 3/20 | |
| 2021/0055753 A1 * | 2/2021 | Yasusaka | G05F 1/467 | |
| 2021/0278868 A1 * | 9/2021 | Cuenca | H02M 1/0045 | |
| 2022/0100218 A1 * | 3/2022 | Jung | G05F 1/575 | |

FOREIGN PATENT DOCUMENTS

| | | | |
|---|---|---|---|
| EP | 4106170 A1 * | 12/2022 | G06F 1/26 |
| KR | 10-2015-0073650 A | 7/2015 | |

* cited by examiner

FIG. 5

| MODE | VREF1 | VREF2 |
|------|-------|-------|
| M1   | V11   | V21   |
| M2   | V12   | V22   |
| M3   | V13   | V23   |

FIG. 7

| DC[7:1] | TR1 | TR2 | TR3 | TR4 | TR5 | TR6 | TR7 |
|---------|-----|-----|-----|-----|-----|-----|-----|
| 0000000 | OFF | OFF | OFF | OFF | OFF | OFF | OFF |
| 0000001 | ON  | OFF | OFF | OFF | OFF | OFF | OFF |
| 0000011 | ON  | ON  | OFF | OFF | OFF | OFF | OFF |
| 0000111 | ON  | ON  | ON  | OFF | OFF | OFF | OFF |
| 0001111 | ON  | ON  | ON  | ON  | OFF | OFF | OFF |
| 0011111 | ON  | ON  | ON  | ON  | ON  | OFF | OFF |
| 0111111 | ON  | ON  | ON  | ON  | ON  | ON  | OFF |
| 1111111 | ON  | ON  | ON  | ON  | ON  | ON  | ON  |

POWER SUPPLY METHOD USING A PLURALITY OF VOLTAGE SOURCES AND ELECTRONIC DEVICE USING THE SAME

CROSS-REFERENCE TO RELATED APPLICATION

This application is based on and claims priority under 35 U.S.C. § 119 to Korean Patent Application No. 10-2020-0120037, filed on Sep. 17, 2020, in the Korean Intellectual Property Office, the disclosure of which is incorporated by reference herein in its entirety.

BACKGROUND

1. Field

The disclosure relates to a power supply method and an electronic device using the same, and more particularly, to a power supply method of supplying an additional current by using another voltage source when current consumption increases while supplying a current by using one voltage source, and an electronic device using the same.

2. Description of Related Art

Recently, because one electronic device may perform various operations, a range of current consumption of electronic devices has increased. For example, for a display apparatus, an increase in a resolution and a scan rate of a display causes a continuous increase in a maximum value of current consumption in a display driving circuit, thereby increasing a range of current consumption. In addition, the current consumption in the display driving circuit may vary in real-time according to various causes such as a feature of image data to be processed and an operating mode of the display apparatus.

Accordingly, a need has increased for a method of preventing unnecessary current consumption by adjusting supply of a current according to a real-time change of the current consumption while covering an increased current consumption.

SUMMARY

Provided are a power supply method of supplying an additional current by using another voltage source when current consumption increases while supplying a current by using one voltage source, and an electronic device using the same.

Additional aspects will be set forth in part in the description which follows and, in part, will be apparent from the description, or may be learned by practice of the presented embodiments.

In accordance with an aspect of the disclosure, an electronic device includes a power management device configured to supply a plurality of input voltages; a power module configured to generate an output voltage using at least one of the plurality of input voltages, and to output the generated output voltage; and a system load configured to operate by receiving the output voltage, wherein the power module includes: a first power module configured to receive a first input voltage from the power management device, and to generate a first output current using the first input voltage; and a second power module configured to receive a second input voltage from the power management device, and to generate a second output current using the second input voltage based on the first input voltage being lower than a first reference voltage.

In accordance with an aspect of the disclosure, a power supply method of supplying an output current using a plurality of input voltages includes generating a first output current using a first input voltage among the plurality of input voltages; comparing the first input voltage to a first reference voltage to generate a first comparison result; generating a comparison signal corresponding to the first comparison result; generating a digital code indicating accumulated information of the comparison signal based on the comparison signal; generating a second output current corresponding to the digital code using a second input voltage among the plurality of input voltages; and supplying power using the first output current and the second output current.

In accordance with an aspect of the disclosure, a display apparatus includes a power management device configured to supply a plurality of input voltages; a display panel configured to display image data; and a display driving circuit including a power module configured to supply power for driving the display apparatus, based on at least one input voltage received from the power management device, wherein the power module is further configured to: receive a first input voltage from the power management device, generate a first output current using the first input voltage, generate a second output current by receiving a second input voltage from the power management device based on the first input voltage being lower than a first reference voltage, and supply power for driving the display apparatus, using the first output current and the second output current.

BRIEF DESCRIPTION OF THE DRAWINGS

The above and other aspects, features, and advantages of certain embodiments of the present disclosure will be more apparent from the following detailed description taken in conjunction with the accompanying drawings in which:

FIG. 5 is a reference voltage table according to an embodiment;

FIG. 7 is a table indicating a relationship between a digital code and a plurality of transistors, according to an embodiment;

DETAILED DESCRIPTION OF THE EMBODIMENTS

Figure 1:
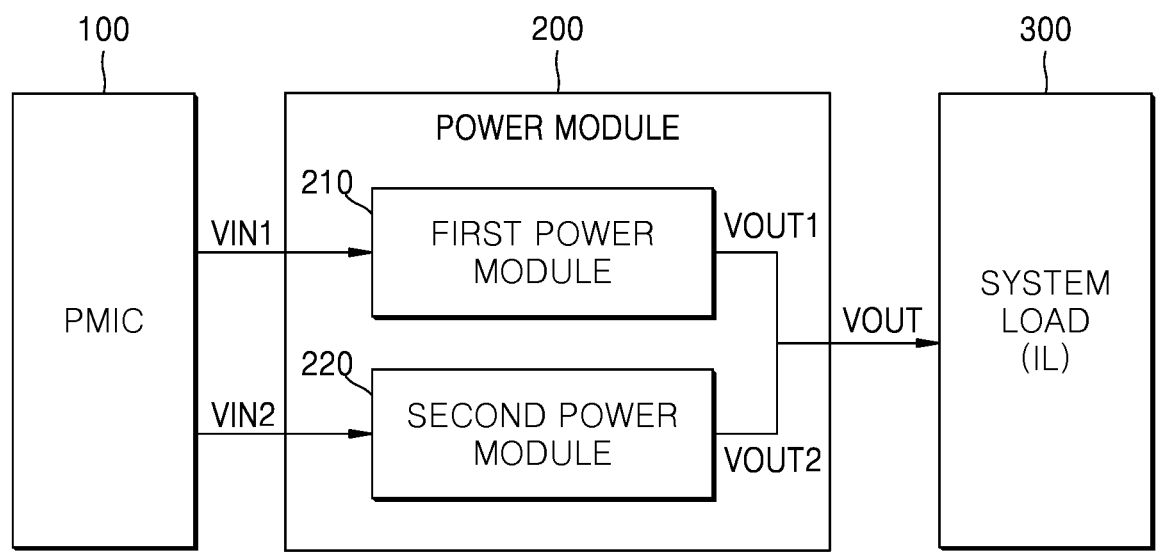
FIG. 1 is a block diagram of an electronic device according to an embodiment.

FIG. 1 is a block diagram of an electronic device 10 according to an embodiment.

Referring to FIG. 1, the electronic device 10 may include a power management device 100, a power module 200, and a system load 300. The electronic device 10 may include a smartphone, a tablet personal computer (PC), a portable multimedia player (PMP), a camera, a wearable device, a television, a digital video disk (DVD) player, a refrigerator, an air conditioner, an air cleaner, a set-top box, a robot, a drone, various kinds of medical appliances, a navigation device, a global positioning system (GPS) receiver, a device for a vehicle, furniture, various kinds of metering instruments, or the like.

The power management device 100 may supply a plurality of input voltages, e.g., first and second input voltages VIN1 and VIN2, to the power module 200. The power management device 100 may be implemented by a power management integrated circuit (PMIC).

The power module 200 may receive at least one of the first and second input voltages VIN1 and VIN2 from the power management device 100 and supply an output voltage VOUT suitable for driving the system load 300. The power module 200 according to an embodiment may include a first power module 210 and a second power module 220. The power module 200 may supply power to the system load 300 by using a first output voltage VOUT1 generated by the first power module 210. In addition, the power module 200 may additionally supply power to the system load 300 by using a second output voltage VOUT2 generated by the second power module 220 when a load current IL of the system load 300 increases.

The first power module 210 may receive the first input voltage VIN1 from the power management device 100 and generate the first output voltage VOUT1 by using the received first input voltage VIN1. When the load current IL of the system load 300 is a particular level, or lower, for example a first current level or lower, the first output voltage VOUT1 generated by the first power module 210 may be supplied to the system load 300 as the output voltage VOUT.

The second power module 220 may receive the second input voltage VIN2 from the power management device 100 and generate the second output voltage VOUT2 by using the received second input voltage VIN2. The second input voltage VIN2 may be higher than the first input voltage VIN1, but embodiments are not limited thereto. The second power module 220 may be implemented to generate the second output voltage VOUT2 when the load current IL of the system load 300 exceeds the particular level, for example the first current level. The second output voltage VOUT2 generated by the second power module 220 may be added to the first output voltage VOUT1 and then supplied to the system load 300 as the output voltage VOUT.

The system load 300 may include various chips or modules, for example a modem, an application processor, a memory, and a display, included in the electronic device 10. In addition, in an embodiment, the system load 300 may include an operation block, a function block, or an Internet protocol (IP) block included in the electronic device 10, e.g., a multimedia block, a memory controller, or the like in the application processor. The system load 300 may operate based on the output voltage VOUT received from the power module 200.

Figure 2:
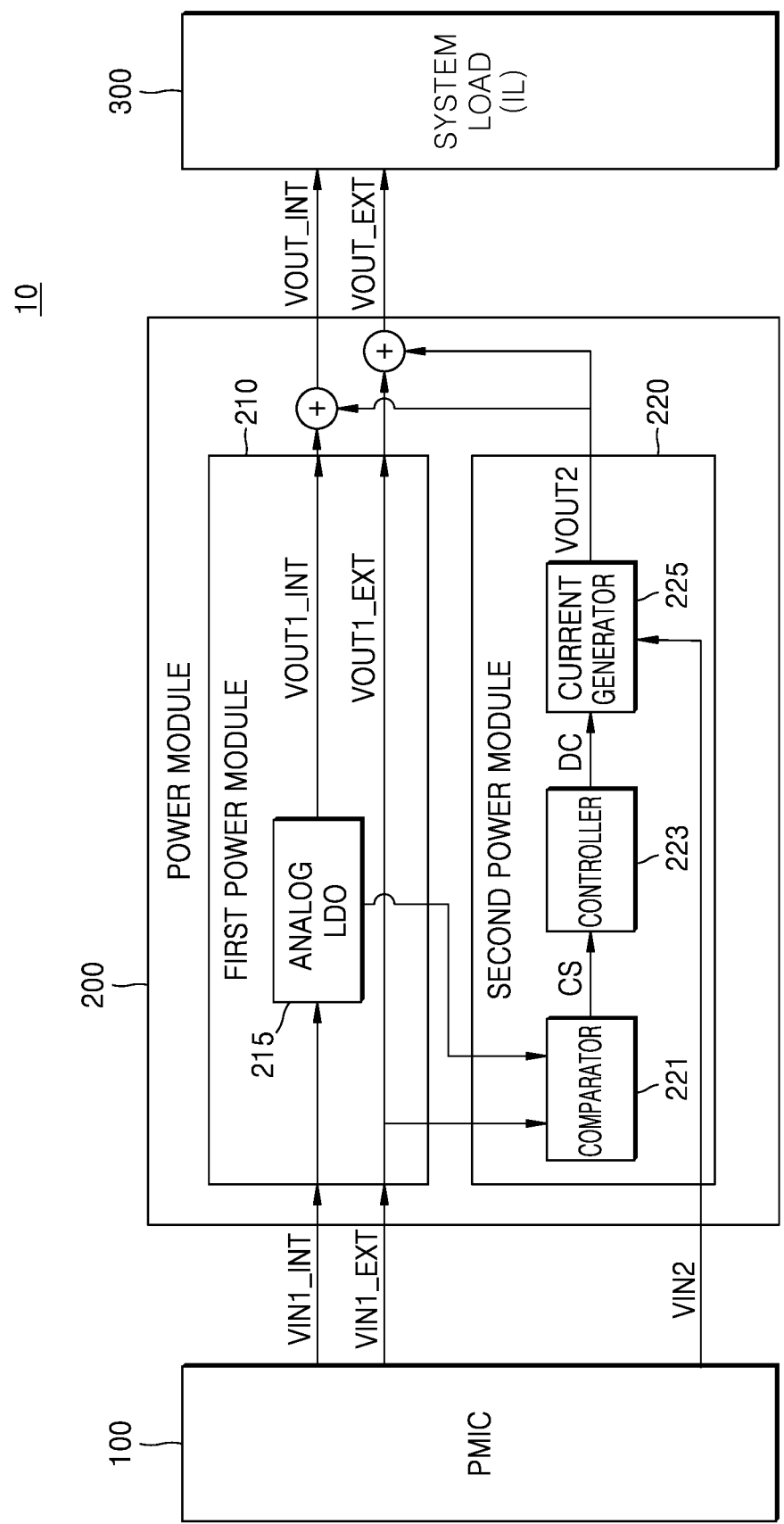
FIG. 2 is a detailed block diagram of an electronic device according to an embodiment.

FIG. 2 is a detailed block diagram of an electronic device according to an embodiment. In detail, FIG. 2 is a detailed block diagram of the electronic device 10 of FIG. 1. For example, the first power module 210 may include at least two current paths, and one of the at least two current paths may include an analog low drop-out (LDO) regulator 215. In addition, the second power module 220 may include a comparator 221, a controller 223, and a current generator 225.

Referring to FIG. 2, the first power module 210 may supply power in two modes. For example, the first power module 210 may supply power in a first power supply mode, for example an external power supply mode, in which a voltage received from the power management device 100 is output without a separate conversion, or a second power supply mode, for example an internal power supply mode, in which a voltage having a certain level is output by using a regulator from the voltage received from the power management device 100.

For example, in the external power supply mode, the first power module 210 may receive a first external input voltage VIN1_EXT from the power management device 100 and output a first external output voltage VOUT1_EXT through a line. When a voltage drop occurs due to a parasitic resistor in the line during a process of transmitting the first external input voltage VIN1_EXT through the line, the first external output voltage VOUT1_EXT may be lower than the first external input voltage VIN1_EXT. In embodiments, in the internal power supply mode, the first power module 210 may receive a first internal input voltage VIN1_INT from the power management device 100 and generate a first internal output voltage VOUT1_INT having the certain level through the analog LDO regulator 215. An example of a detailed configuration of the first power module 210 will be described below with reference to FIG. 2.

The first power module 210 may operate in either the external power supply mode or the internal power supply mode. That is, the first power module 210 may generate the first external output voltage VOUT1_EXT by receiving the first external input voltage VIN1_EXT, or generate the first internal output voltage VOUT1_INT by receiving the first internal input voltage VIN1_INT, but may not generate both the first external output voltage VOUT1_EXT and the first internal output voltage VOUT1_INT. Therefore, the first input voltage VIN1 of FIG. 1 may be the first external output voltage VOUT1_EXT or the first internal output voltage VOUT1_INT according to a power supply mode of the first power module 210.

For example, the first power module 210 may operate in the external power supply mode or the internal power supply mode according to settings of a user. However, embodiments are not limited thereto, and a power supply mode may be selected according to various criteria. For example, the first power module 210 may be implemented to change a power supply mode according to a range of the load current IL of the system load 300. For example, the first power module 210 may be implemented to operate in the external power supply mode when the load current IL belongs to a first current range and operate in the internal power supply mode when the load current IL belongs to a second current range including levels higher than those in the first current range. To this end, the first power module 210 may further include a detector (not shown) configured to detect the load current IL.

When the load current IL of the system load 300 increases during a process of supplying power from the first power module 210, a voltage drop current-resistance (IR) drop) occurs in the first external input voltage VIN1_EXT (or the first external output voltage VOUT1_EXT) and the first internal input voltage VIN1_INT due to the parasitic resistance on the line. In addition, when the voltage drop increases, the first external input voltage VIN1_EXT for the first external output voltage VOUT1_EXT) and the first internal input voltage VIN1_INT may decrease to a voltage level insufficient for the system load 300 to operate.

Accordingly, the second power module 220 may supply power to the system load 300 together with the first power module 210. For example, when the load current IL of the system load 300 exceeds the particular level, for example the first current level, the second power module 220 may supply the second output voltage VOUT2 by determining that additional power is necessary. Herein, the first current level may be set by the user or a manufacturer and differently set for each system load 300. Hereinafter, a method, performed by the second power module 220, of additionally supplying power will be described.

For example, the comparator 221 in the second power module 220 may receive the first external input voltage VIN1_EXT and the first internal input voltage VIN1_INT from the first power module 210. Thereafter, the comparator 221 may compare one of the received first external input voltage VIN1_EXT and first internal input voltage VIN1_INT to a reference voltage and generate a comparison signal CS indicating the comparison result. For example, the comparator 221 may compare the first external input voltage VIN1_EXT to the reference voltage when the first power module 210 operates in the external power supply mode, and compare the first internal input voltage VIN1_INT to the reference voltage when the first power module 210 operates in the internal power supply mode. Herein, the reference voltage may be a voltage used as a reference to determine whether the second power module 220 needs to additionally supply power, and may correspond to the first current level.

The controller 223 may receive the comparison signal CS and output a digital code DC corresponding to an additional current amount based on the comparison signal CS. For example, the controller 223 may generate the digital code DC by increasing a code value when the comparison signal CS indicates that a received input voltage is lower than the reference voltage and decreasing the code value when the comparison signal CS indicates that the received input voltage is higher than the reference voltage. The controller 223 may be implemented by software, hardware, or a combination of software and hardware, such as firmware. An example of a detailed method, performed by the controller 223, of generating the digital code DC will be described below with reference to FIG. 6.

The current generator 225 may supply the second output voltage VOUT2 by receiving the digital code DC and generating a current amount corresponding to the digital code DC. An example of a detailed method, performed by the current generator 225, of generating the second output voltage VOUT2 will be described below with reference to FIGS. 4, 6, and 7.

When the power module 200 operates in the internal power supply mode, the second output voltage VOUT2 generated by the second power module 220 may be added to the first internal output voltage VOUT1_INT generated by the first power module 210 and then supplied to the system load 300 as an internal output voltage VOUT1_INT. When the power module 200 operates in the external power supply mode, the second output voltage VOUT2 generated by the second power module 220 may be added to the first external output voltage VOUT1_EXT generated by the first power module 210 and then supplied to the system load 300 as an external output voltage VOUT_EXT.

Although FIG. 2 shows that the internal output voltage VOUT_INT and the external output voltage VOUT_EXT are supplied to the system load 300 through different lines, embodiments are not limited thereto. Because the power module 200 may operate in either the internal power supply mode or the external power supply mode, it may be implemented that the internal output voltage VOUT1_INT and the external output voltage VOUT_EXT are supplied to the system load 300 through a single line.

In addition, although FIG. 2 shows that the first power module 210 operates in the external power supply mode or the internal power supply mode, embodiments are not limited thereto. For example, the first power module 210 may be implemented to operate only in the external power supply mode or the internal power supply mode. As another example, the first power module 210 may be implemented to supply power in three or more power supply modes.

In a related art power module, because power is supplied to the system load 300 by using only one power source, a range of current consumption of the system load 300 may be restricted due to a voltage drop effect of power. However, according to embodiments of the present disclosure, the power module 200 may normally supply power to the system load 300 by using the first power module 210, and when current consumption of the system load 300 exceeds the particular level, the power module 200 may additionally supply power to the system load 300 by using the second power module 220 having a separate power source. Accordingly, even when a range of current consumption of the system load 300 increases, power may be stably supplied.

Figure 3:
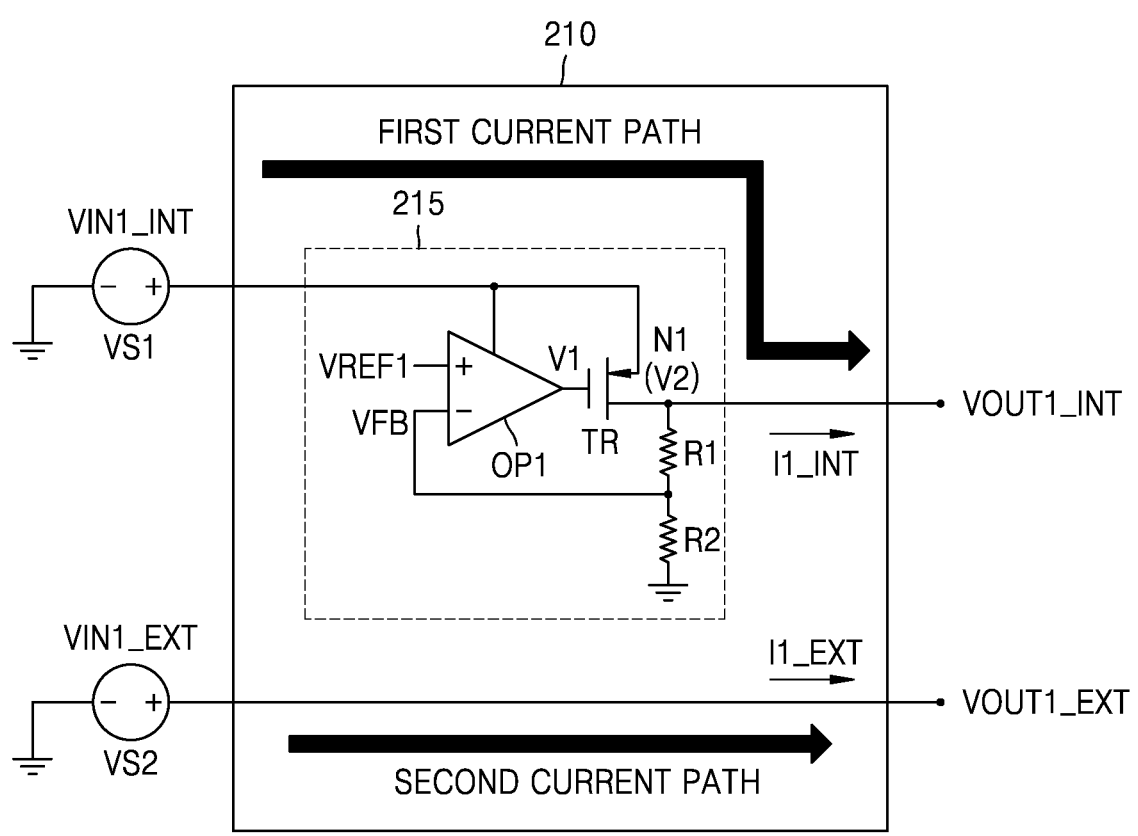
FIG. 3 is a detailed block diagram of a first power module according to an embodiment.

FIG. 3 is a detailed block diagram of the first power module 210 according to an embodiment. Referring to FIG. 3, the first power module 210 may include a first current path corresponding to the internal power supply mode and a second current path corresponding to the external power supply mode.

The first current path corresponding to the internal power supply mode is a path through which a current supplied from a first voltage source VS1 of the power management device 100 is supplied as a first internal current I1_INT to the system load 300 through the analog LDO regulator 215. The first power module 210 may generate the first internal output voltage VOUT1_INT by using the first internal input voltage VIN1_INT and the analog LDO regulator 215. For example, the analog LDO regulator 215 may include a first operational amplifier (OPAMP) OP1, a transistor TR, and first and second resistors R1 and R2. The analog LDO regulator 215 may further include other components.

The analog LDO regulator 215 may receive the first internal input voltage VIN1_INT from the first voltage source VS1 and convert the first internal input voltage VIN1_INT into the first internal output voltage VOUT1_INT having the certain level. A first reference voltage VREF1 is input to a + terminal of the first OPAMP OP1, a feedback voltage VFB is input to a − terminal of the first OPAMP OP1, and the first internal input voltage VIN1_INT is input to a power terminal of the first OPAMP OP1. The first OPAMP OP1 may compare the first reference voltage VREF1 to the feedback voltage VFB, and output an amplified voltage V1 by amplifying a difference between the first reference voltage VREF1 and the feedback voltage VFB.

The transistor TR may be connected between a power node to which the first internal input voltage VIN1_INT is supplied and a first node N1, and driven by the amplified voltage V1. The first resistor R1 and the second resistor R2 may be connected between the first node N1 and a ground node. The first resistor R1 and the second resistor R2 may divide a second voltage V2 of the first node N1 to generate the feedback voltage VFB. The second voltage V2 may be output as the first internal output voltage VOUT1_INT.

In addition, the second current path corresponding to the external power supply mode is a path through which a current supplied from a second voltage source VS2 of the power management device 100 is supplied as a first external current I1_EXT to the system load 300 through a single line. For example, the first power module 210 may generate the first external output voltage VOUT1_EXT by using the first external input voltage VIN1_EXT. A configuration of the second current path is not limited to the present embodiment, and the present embodiment may be implemented to include various configurations.

Although not shown in FIG. 3, each line in the first power module 210 may include a parasitic resistance, and a voltage drop may occur due to the parasitic resistance. For example, a voltage having a level lower than that of the first internal input voltage VIN1_INT may be input a power terminal of the first OPAMP OP1, the first internal output voltage VOUT1_INT may have a level lower than that of the voltage V2 of the first node N1, and the first external output voltage VOUT1_EXT may have a level lower than that of the first external input voltage VIN1_EXT.

Figure 4:
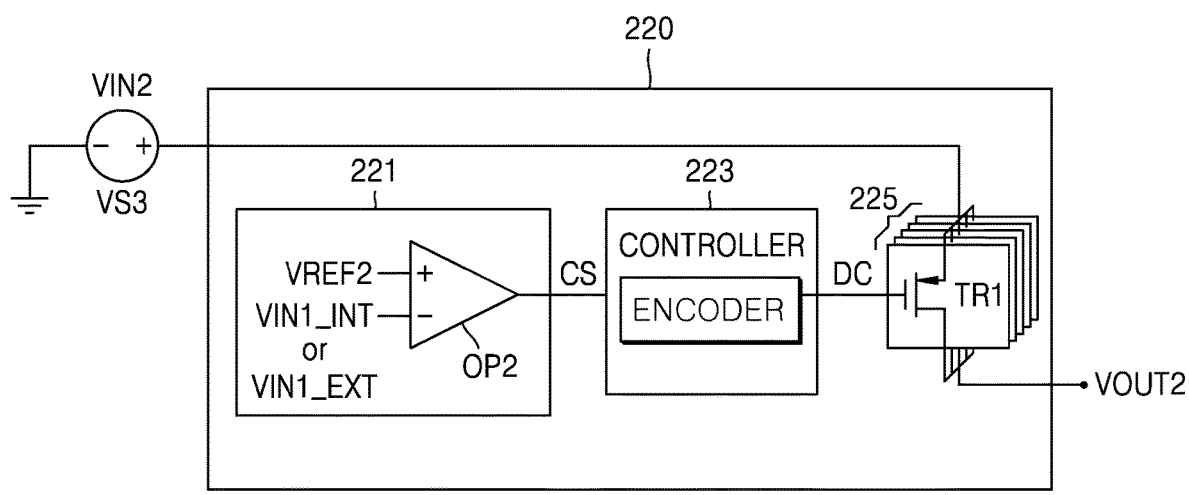
FIG. 4 is a detailed block diagram of a second power module according to an embodiment.

FIG. 4 is a detailed block diagram of the second power module 220 according to an embodiment.

Referring to FIG. 4, the comparator 221 may be implemented to include a second OPAMP OP2. A second reference voltage VREF2 is input to a terminal of the second OPAMP OP2, and a comparative voltage is input to a − terminal of the second OPAMP OP2. Herein, the comparative voltage is the first input voltage VIN1 of the first power module 210. In other words, the comparative voltage is the first external input voltage VIN1_EXT when the first power module 210 operates in the external power supply mode, and is the first internal input voltage VIN1_INT when the first power module 210 operates in the internal power supply mode. Although not shown in FIG. 4, the comparator 221 may further include components such as a resistor besides the second OPAMP OP2.

The comparator 221 may compare the second reference voltage VREF2 to the first input voltage VIN1 and output the comparison signal CS indicating the comparison result. Herein, the second reference voltage VREF2 is a voltage as a reference to determine whether the second power module 220 needs to additionally supply power. The comparison signal CS may have a first level, for example a high level, when the second reference voltage VREF2 is higher than the first input voltage VIN1, and have a second level, for example a low level, when the second reference voltage VREF2 is lower than the first input voltage VIN1. The comparison signal CS is provided to the controller 223.

The controller 223 may receive the comparison signal CS and output the digital code DC corresponding to an additional current amount based on the comparison signal CS. The controller 223 may include an encoder to generate the digital code DC. For example, the controller 223 may check the comparison signal CS in a preset period and generate the digital code DC by increasing a code value when the comparison signal CS has the first level and decreasing the code value when the comparison signal CS has the second level.

For example, the digital code DC may have a default code value, e.g., a code value consisting of a series of zeros, for the first time and may be implemented to have only a code value greater than or equal to the default code value according to embodiments. That is, when it is confirmed that a level of the comparison signal CS is the second level in a state in which the digital code DC has the default code value at the moment, the controller 223 may maintain the digital code DC as the default code value.

The current generator 225 may include a plurality of transistors, and each of the plurality of transistors may be connected between a third voltage source VS3 configured to supply the second input voltage VIN2 and a node of the second output voltage VOUT2 and may be controlled by the digital code DC. For example, each of the plurality of transistors may be turned on or off according to a corresponding value of the digital code DC. Accordingly, when all of the plurality of transistors are turned on, the highest current is output, and the more the number of turn-off transistors, the less an output current.

As described above, the second power module 220 may generate the digital code DC corresponding to a vales obtained by accumulating the comparison result of the first input voltage VIN1 and the second reference voltage VREF2 and supply a current amount corresponding to the generated digital code DC.

Although not shown in FIG. 4, each line in the second power module 220 may include as parasitic resistance, and a voltage drop may occur due to the parasitic resistance. For example, a voltage having a level lower than that of the second input voltage VIN2 may be input to source terminals of the transistors in the current generator 225.

FIG. 5 is a reference voltage table according to an embodiment.

In detail, FIG. 5 shows a reference voltage table including information about the first reference voltage VREF1 and the second reference voltage VREF2 according to modes of the system load 300.

The power module 200 according to an embodiment may set the first reference voltage VREF1 and the second reference voltage VREF2 by using the reference voltage table to more precisely supply power according to states operations of the system load 300.

For example, the system load 300 may operate in a plurality of modes such as a normal mode and a sleep mode in which average power consumption differs from each other. Accordingly, a range of the load current IL of the system load 300 may be different in each mode.

Therefore, when a range of the load current IL corresponding to a current mode of the system load 300 is determined, power may be supplied by using only the first power module 210 in a range having a relatively low current level in the determined range, and power may be supplied by using both the first power module 210 and the second power module 220 in a range having a relatively high current level in the determined range, and power may be more precisely supplied than when only fixed reference voltages are used regardless of modes.

The first reference voltage VREF1 and the second reference voltage VREF2 may be set in correspondence to a mode-specific range of the load current IL. For example, a value V11 of the first reference voltage VREF1 and a value V21 of the second reference voltage VREF2 are voltages set to correspond to a range of the load current IL when the system load 300 operates in a first mode M1, a value V12 of the first reference voltage VREF1 and a value V22 of the second reference voltage VREF2 are voltages set to correspond to a range of the load current IL when the system load 300 operates in a second mode M2, and a value V13 of the first reference voltage VREF1 and a value V23 of the second reference voltage VREF2 are voltages set to correspond to a range of the load current IL when the system load 300 operates in a third mode M1.

The power module 200 may check the first reference voltage VREF1 and the second reference voltage VREF2 corresponding to a current mode of the system load 300 by using the reference voltage table, and supply power by using the checked first reference voltage VREF1 and second reference voltage VREF2.

Although FIG. 5 shows that the reference voltage table includes the values V11, V12, and V13 of the first reference voltage VREF1 and the values V21, V22, and V23 of the second reference voltage VREF2 corresponding to the first to third modes M1, M2, and M3, respectively, the reference voltage table may be implemented to include values of the first reference voltage VREF1 and the second reference voltage VREF2 corresponding to two or fewer modes, or for or more modes.

In addition, types of modes in which the system load 300 operates are not limited to the example described above and may be set based on a combination of various pieces of information associated with the system load 300. For example, when the system load 300 is a display driving circuit, the nodes may be set based on at least one or a combination of various pieces of information including a frame rate, an image processing amount, and the like.

Figure 6:
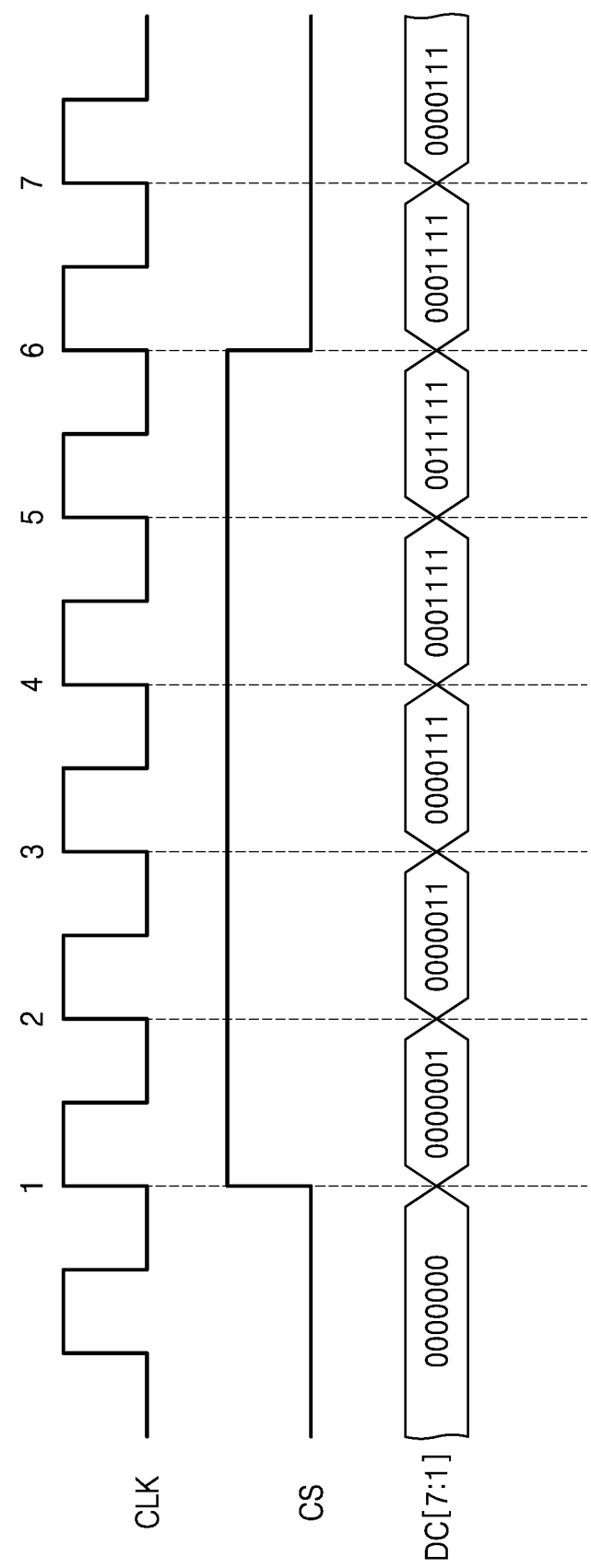
FIG. 6 is a waveform diagram for describing a digital code generation operation according to an embodiment.

FIG. 6 is a waveform diagram for describing a digital code generation operation according to an embodiment.

Referring to FIG. 6, the controller 223 may receive the comparison signal CS from the comparator 221. In addition, the controller 223 may generate the digital code DC based on a clock signal CLK and the comparison signal CS. In the example shown in FIG. 6, the digital code DC includes seven bits.

For example, the controller 223 may generate the digital code DC by checking a value of the comparison signal CS based on the clock signal CLK including a pulse repeated in a preset period, and changing a code value according to the checked value. An initial value of the digital code DC may be set to '0000000'.

When the comparison signal CS has the first level, for example logic high, the controller 223 may check a bit having a value of 0 in the order from the least significant bit (LSB) to the most significant bit (MSB) of the digital code DC and change the checked bit to a value of 1. For example, when it is checked that the comparison signal CS has the first level in a state in which a value of the digital code DC is '0000000', the controller 223 may change the value of the digital code DC to '0000001'. When it checked again that the comparison signal CS has the first level in a next period, the controller 223 may change the value of the digital code DC to '0000011'.

On the contrary, when the comparison signal CS has the second level, for example logic low, the controller 223 may check a bit having a value of 1 in the order from the MSB to the LSB of the digital code DC and change the checked bit to a value of 0. For example, when it is checked that the comparison signal CS has the second level in a state in which a value of the digital code DC is '0011111', the controller 223 may change the value of the digital code DC to '0001111'.

Thereafter, as described above, the controller 223 may provide the generated digital code DC to the current generator 225.

However, a method, performed by the controller 223, of generating the digital code DC is not limited to the example described above. For example, when the comparison signal CS has the first level, the controller 223 may change a current code value of the digital code DC to a subsequent code value. In addition, when the comparison signal CS has the second level, the controller 223 may change a current code value of the digital code DC to a previous code value. For example, when the comparison signal CS has the first level, a current code value '0000001' of the digital code DC may be changed to a subsequent code value '0000010'.

FIG. 7 is a table indicating a relationship between a digital code and a plurality of transistors, according to an embodiment. In the example shown in FIG. 7, may correspond to an example of current generator 225 of FIG. 4 which includes seven transistors, e.g., first transistor TR1, second transistor TR2, third transistor TR3, fourth transistor TR4, fifth transistor TR5, sixth transistor TR6 and seventh transistor TR7.

The first to seventh transistors TR1 to TR7 may correspond to a plurality of bits included in the digital code DC, respectively. Referring to FIG. 7, when the digital code DC is a seven-bit code (DC[7:1]), the first to seventh transistors TR1 to TR7 may correspond to the seven bits in the digital code DC, respectively. For example, the first transistor TR1 may correspond to a first digital code DC[1] and the second transistor TR2 may correspond to a second digital code DC[2].

In addition, each of the first to seventh transistors TR1 to TR7 may be turned on or off in response to a corresponding bit. For example, each of the first to seventh transistors TR1 to TR7 may be turned on when a corresponding bit in the digital code DC is 1, and turned off when a corresponding bit in the digital code DC is 0. For example, the first transistor TR1 may be turned on when the first digital code DC[1] is 1, and turned off when the first digital code DC[1] is 0.

Although the description of FIG. 7 above is based on an example in which the current generator 225 includes seven transistors, the current generator 225 may be implemented to include six or fewer transistors, or eight or more transistors according to embodiments.

In addition, a method, performed by the current generator 225, of generating a current by using transistors is not limited to the example described above. For example, a turn-on/turn-off combination of transistors ma be matched for each code value of the digital code DC, and the current generator 225 may drive the transistors according to a turn-on/turn-off combination corresponding to a received code value of the digital code DC.

Figure 8:
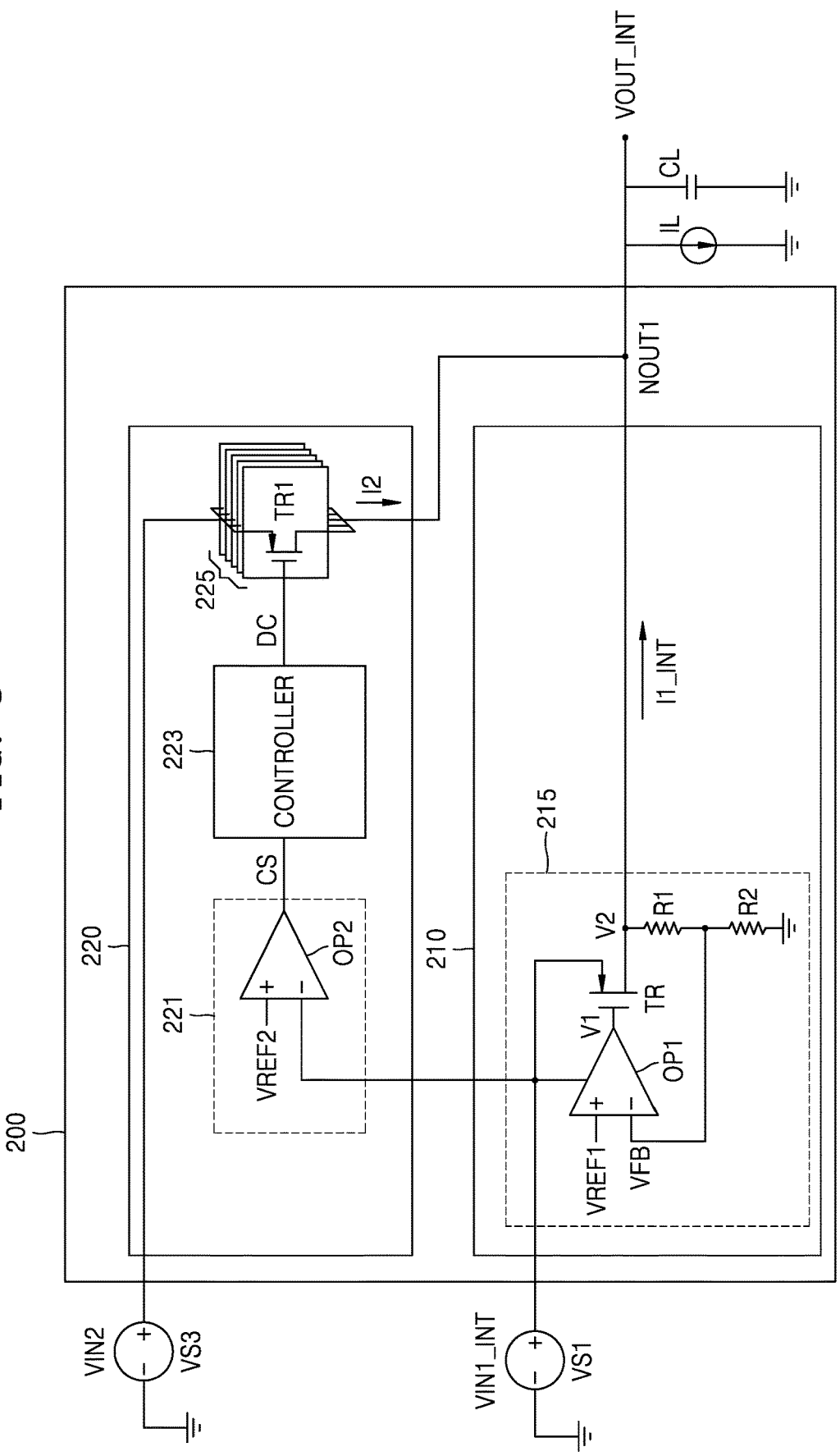
FIG. 8 is a diagram for describing an operation of a power module in an internal power supply mode, according to an embodiment.

FIG. 8 is a diagram for describing an operation of a power module in the internal power supply mode, according to an embodiment. In detail, FIG. 8 is a diagram for describing an example in which the first power module 210 supplies power in the internal power supply mode, and the second power module 220 supplies additional power. For easier understanding, a configuration of the first power module 210 associated with the external power supply mode is omitted from FIG. 8.

Referring to FIG. 8, the power module 200 may supply the internal output voltage VOUT_INT to the system load 300, the load current IL may flow through the system load 300, and a load capacitor CL may have a load capacitance. The power module 200 may receive the first internal input voltage VIN1_INT from the first voltage source VS1, and the first internal input voltage VIN1_INT may be input to each of the power terminal of the first OPAMP OP1 and the − terminal of the second OPAMP OP2. The analog LDO regulator 215 including the first OPAMP OP1 may output the first internal current I1_INT according to the method described above with reference to FIG. 3.

When the load current IL of the system load 300 has a relatively low level, a voltage drop of the first internal input voltage VIN1_INT due to a parasitic resistance on a line may be small. Accordingly, the first internal input voltage VIN1_INT for example, a reduced first internal input voltage VIN1_INT, may be still higher than the second reference voltage VREF2. Therefore, the comparator 221 may output, to the controller 223, the comparison signal CS indicating that the first internal input voltage VIN1_INT is higher than the second reference voltage VREF2.

Because the comparison signal CS indicates that the first internal input voltage VIN1_INT is higher than the second reference voltage VREF2, the controller 223 may decrease a code value of the digital code DC. Meanwhile, in an initial stage, because the digital code DC has the default code value, the controller 223 may maintain the digital code DC having the default code value as it is. The current generator 225 may not supply a current upon receiving the digital code DC having the default code value. That is, the load current IL of the system load 300 may be the same as the first internal current I1_INT supplied from the first power module 210.

Thereafter, when the load current IL of the system load 300 gradually increases and has a relatively high level, a voltage drop of the first internal input voltage VIN1_INT may be significantly large. Accordingly, the first internal input voltage VIN1_INT for example, the reduced first internal input voltage VIN1_INT, may be lower than the second reference voltage VREF2. Therefore, the comparator 221 may output, to the controller 223, the comparison signal CS indicating that the first internal input voltage VIN1_INT is lower than the second reference voltage VREF2.

Because the comparison signal CS indicates that the first internal input voltage VIN1_INT is lower than the second reference voltage VREF2, the controller 223 may increase a code value of the digital code DC. Thereafter, the current generator 225 may supply a current, for example a second current I2, corresponding to the digital code DC having the increased code value upon receiving the digital code DC.

The second current I2 supplied from the current generator 225 may be added to the first internal current I1_INT supplied from the first power module 210, at a first output node NOUT1. Therefore, the load current IL of the system load 300 may be represented by a sum of the first internal current I1_INT supplied from the first power module 210 and the second current I2 supplied from the second power module 220.

A related art power module may be implemented to supply power to the system load 300 by using only the first power module 210. In this case, when the load current IL of the system load 300 increases, a significant voltage drop may occur at a voltage, for example the first external input voltage VIN1_EXT or the first internal input voltage VIN1_INT, supplied from the first power module 210 so that the voltage supplied from the first power module 210 decreases to a voltage level insufficient for the system load 300 to operate.

However, the power module 200 according to embodiments may supply a current through the first pox nodule 210, and then when the load current IL of the system load 300 increases to the particular level, the power module 200 may supply an additional current through the second power module 220. Accordingly, a voltage drop effect due to an increase in the load current IL may be distributed to the second power module 220, and thus, a voltage drop of a voltage supplied from the first power module 210 may be small. A detailed description of an example thereof will be made below with reference to FIG. 13A.

Figure 9:
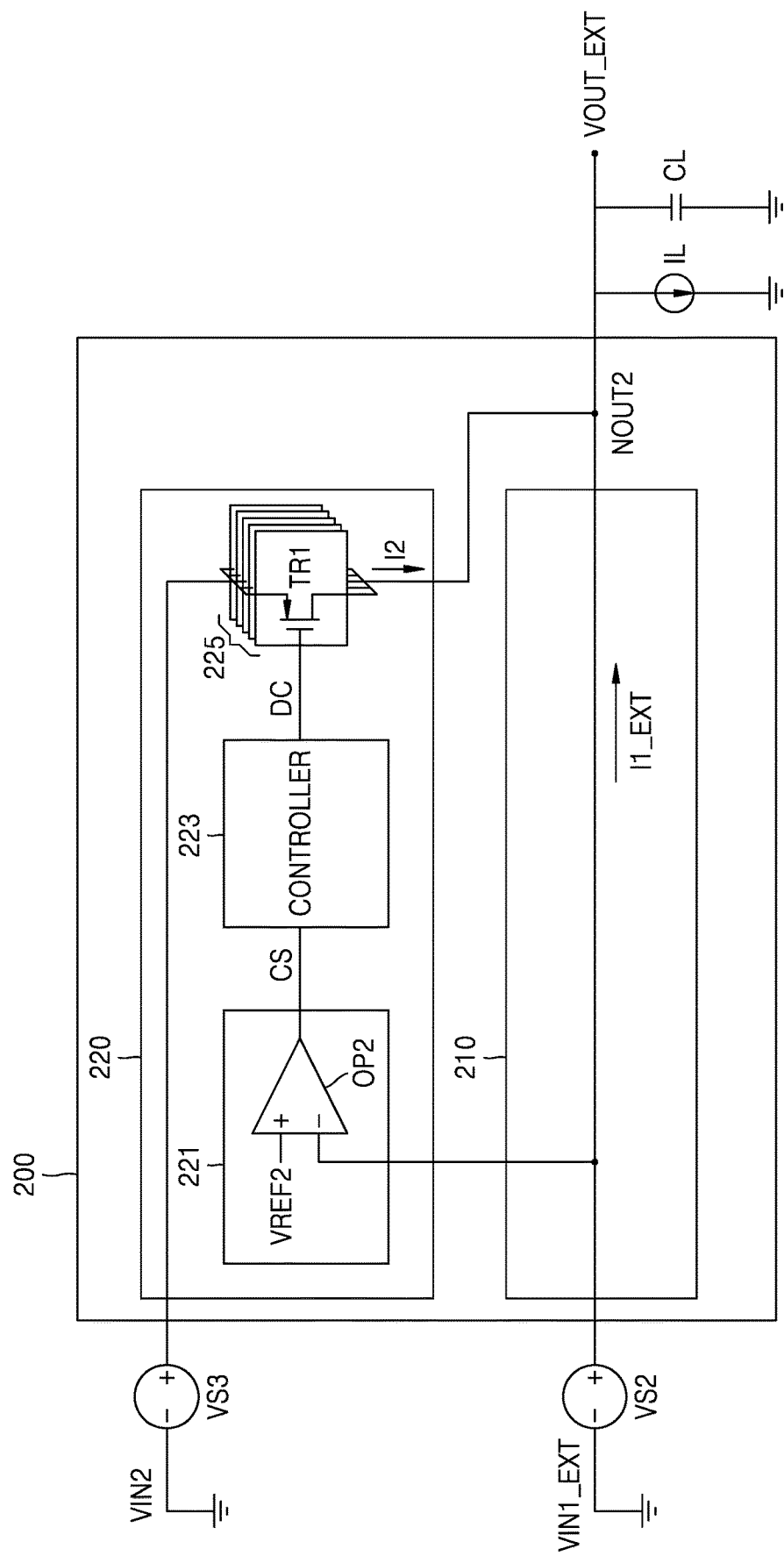
FIG. 9 is a diagram for describing an operation of a power module in an external power supply mode, according to an embodiment.

FIG. 9 is a diagram for describing an operation of a power module in the external power supply mode, according to an embodiment. In detail, FIG. 9 is a diagram for describing an example in which the first power module 210 supplies power in the external power supply mode, and the second power module 220 supplies additional power. For easier understanding, a configuration of the first power module 210 associated with the internal power supply mode is omitted from FIG. 9. Hereinafter, an example in which the load current IL of the system load 300 sequentially increases will be described.

Referring to FIG. 9, the power module 200 may supply the external output voltage VOUT_EXT to the system load 300, the load current IL may flow through the system load 300, and the load capacitor CL may have the load capacitance. The power module 200 may receive the first external input voltage VIN1_EXT from the second voltage source VS2 and generate the first external current I1_EXT by using the first external input voltage VIN1_EXT. In addition, the first external input voltage VIN1_EXT may be input to each of the power terminal of the first OPAMP OP1 and the − terminal of the second OPAMP OP2, or be input to the terminal of the second OPAMP OP2.

When the load current IL of the system load 300 has a relatively low level, a voltage drop of the first external input voltage VIN1_EXT due to a parasitic resistance on a line may be small. Accordingly, the first external input voltage VIN1_EXT for example, a reduced first external input voltage VIN1_EXT, may be still higher than the second reference voltage VREF2. Therefore, the comparator 221 may output, to the controller 223, the comparison signal CS indicating that the first external input voltage VIN1_EXT is higher than the second reference voltage VREF2.

Because the comparison signal CS indicates that the first external input voltage VIN1_EXT is higher than the second reference voltage VREF2, the controller 223 may decrease a code value of the digital code DC. Meanwhile, in an initial stage, because the digital code DC has the default code value, the controller 223 may maintain the digital code DC having the default code value as it is. The current generator 225 may not supply a current upon receiving the digital code DC having the default code value. That is, the load current IL of the system load 300 may be the same as the first external current I1_EXT supplied from the first power module 210.

Thereafter, when the load current IL of the system load 300 gradually increases and has a relatively high level, a voltage drop of the first external input voltage VIN1_EXT may be significantly large. Accordingly the first external input voltage VIN1_EXT for example, the reduced first external input voltage VIN1_EXT, may be lower than the second reference voltage VREF2. Therefore, the comparator 221 may output, to the controller 223, the comparison signal CS indicating that the first external input voltage VIN1_EXT is lower than the second reference voltage VREF2.

Because the comparison signal CS indicates that the first external input voltage VIN1_EXT is lower than the second reference voltage VREF2, the controller 223 may increase a code value of the digital code DC. Thereafter, the current generator 225 may supply a current, for example the second current I2, corresponding to the digital code DC having the increased code value upon receiving the digital code DC.

The second current I2 supplied from the current generator 225 may be added to the first external current I1_EXT supplied from the first power module 210, at a second output node NOUT2. Therefore, the load current IL of the system load 300 may be represented by a sum of the first external current I1_EXT supplied from the first power module 210 and the second current I2 supplied from the second power module 220.

Figure 10:
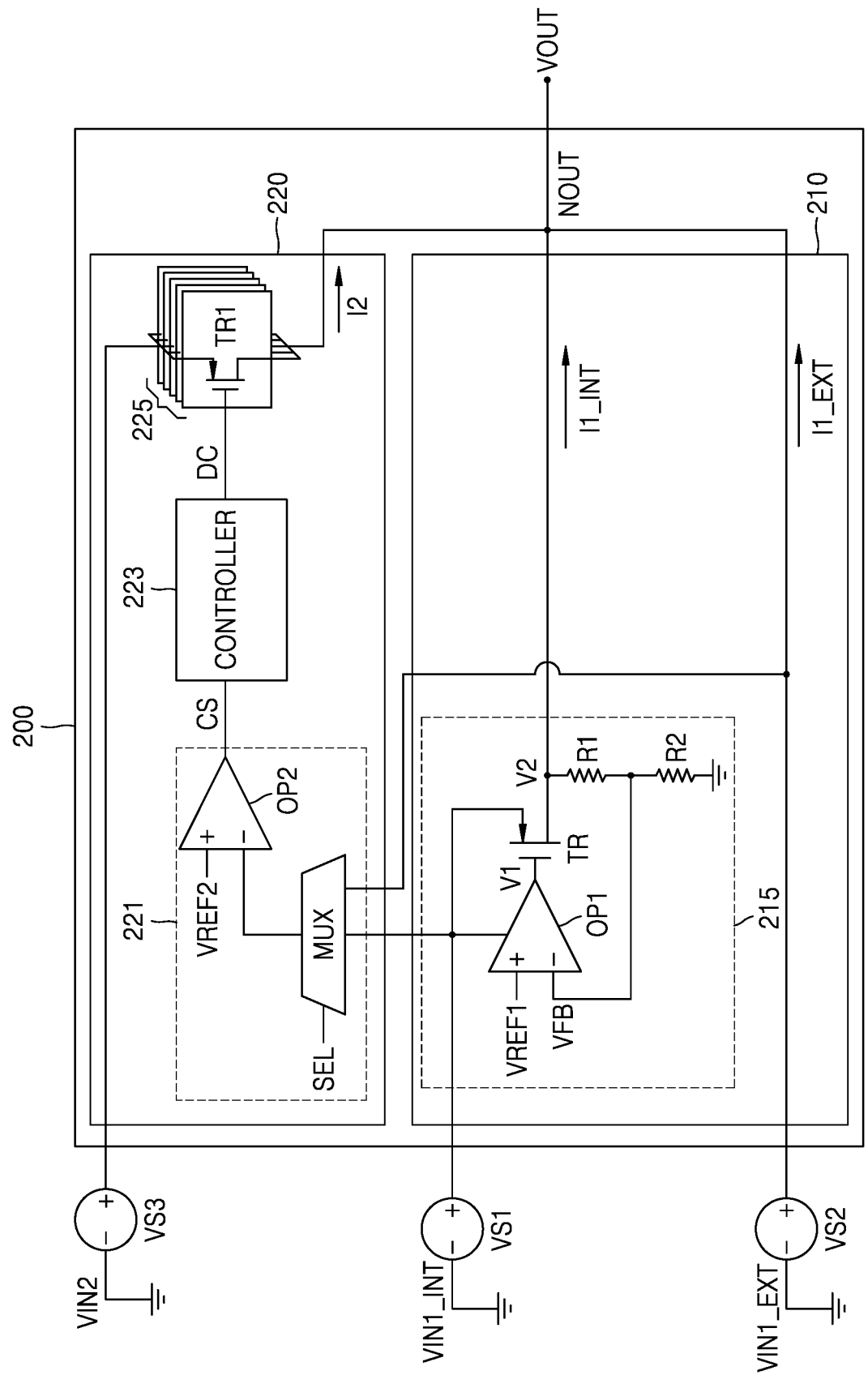
FIG. 10 is a circuit diagram of a power module according to an embodiment.

FIG. 10 is a circuit diagram of a power module according to an embodiment. In detail, FIG. 10 is a detailed circuit diagram of the power module 200.

Referring to FIG. 10, the comparator 221 in the second power module 220 may further include a multiplexer MUX. The multiplexer MUX may receive the first internal input voltage VIN1_INT and the first external input voltage VIN1_EXT of the power management device 100 and output one of the received voltages based on a selection signal SEL. The voltage output from the multiplexer MUX may be input to the − terminal of the second OPAMP OP2.

The selection signal SEL input to the multiplexer MUX is a signal indicating a type of a power supply mode. For example, the selection signal SEL may have the first level, for example the high level, when the power module 200 operates in the internal power supply mode, and have the second level, for example the low level, when the power module 200 operates m the external power supply mode. The selection signal SEL may be received from the system load 300 or generated based on a signal received from the system load 300. However, embodiments are not limited thereto, and the selection signal SEL may be implemented to be generated by the power module 200 or received from the power management device 100.

When the power module 200 operates in the internal power supply mode, the multiplexer MUX may output the first internal input voltage VIN1_INT in response to the selection signal SEL having the first level. When the power module 200 operates in the external power supply mode, the multiplexer MUX may output the first external input voltage VIN1_EXT in response to the selection signal SEL having the second level. In addition, the second power module 220 may output the second current I2 according to the method described above with reference to FIG. 4.

The second current I2 generated by the second power module 220 may be added to the first internal current I1_INT or the first external current I1_EXT supplied from the first power module 210, at an output node NOUT. Herein, the output node NOUT is the first output node NOUT1 of FIG. 8 or the second output node NOUT2 of FIG. 9 according to a power supply mode, and the first output node NOUT1 and the second output node NOUT2 may be implemented as the same node according to embodiments.

Figure 11:
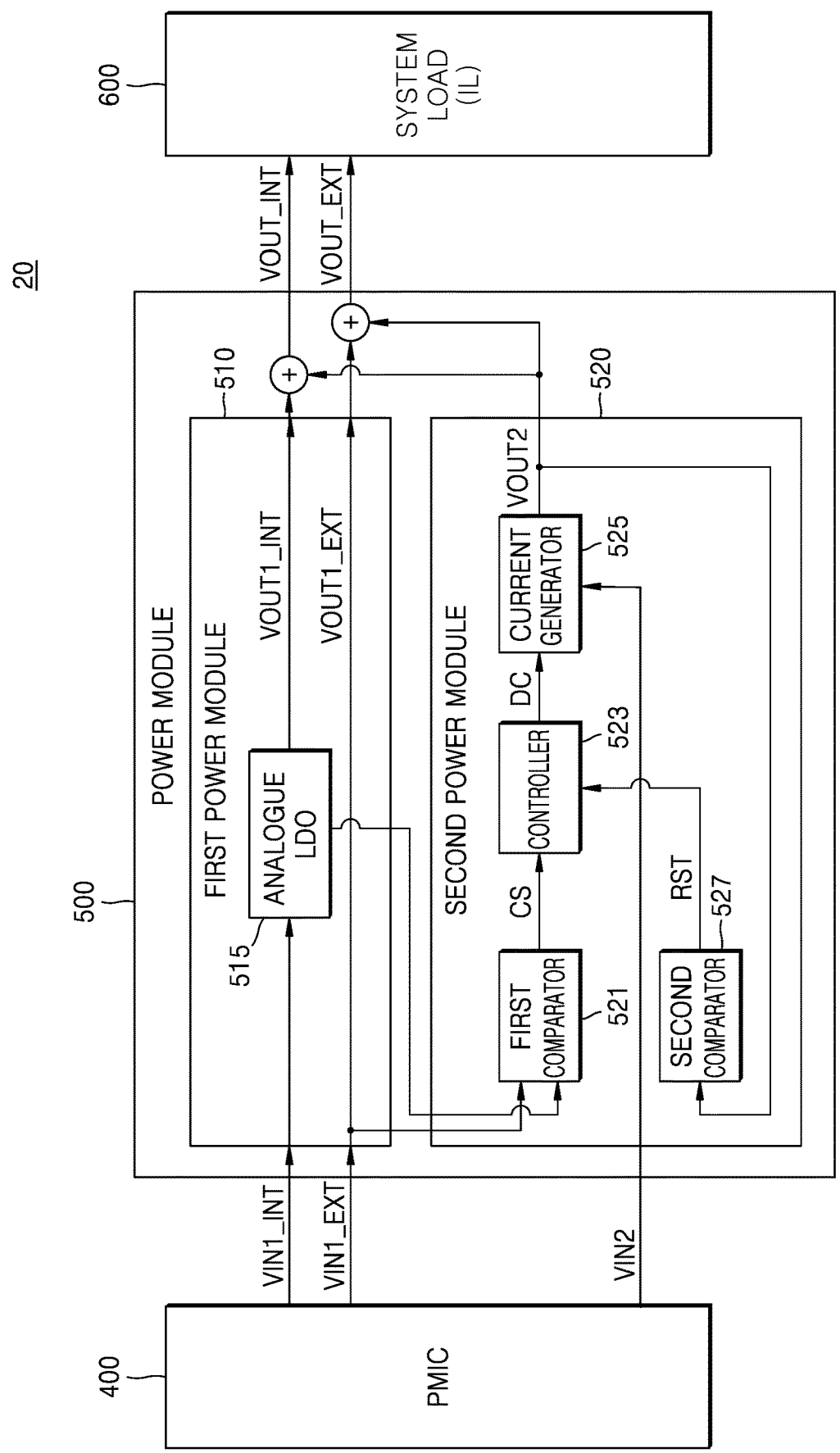
FIG. 11 is a detailed diagram of an electronic device according to an embodiment.

FIG. 11 is a detailed diagram of an electronic device 20 according to an embodiment.

Referring to FIG. 11, the electronic device 20 may include a power management device 400, a power module 500, and a system load 600. The power module 500 may include a first power module 510 and a second power module 520. The second power module 520 may include a first comparator 521, a controller 523, a current generator 525, and a second comparator 527. The electronic device 20 of FIG. 11 is an embodiment in which the second comparator 527 is added to the electronic device 10 of FIG. 1, and the first comparator 521 of FIG. 11 may correspond to the comparator 221 of FIG. 1. Therefore, a description made above with reference to FIGS. 1 to 10 is not repeated herein.

The power module 500 according to an embodiment may immediately suspend supply of additional power when the load current IL sharply decreases due to an internal cause of the system load 600 or the like while supplying the additional power to the system load 600 by using the second power module 520. To this end, the second power module 520 of FIG. 11 may further include the second comparator 527 to be used to determine a time point when the supply of the additional power is suspended.

For example, the second comparator 527 may generate a reset signal RST for resetting the digital code DC when it is confirmed that the second output voltage VOUT2 increases according to a decrease in the load current IL of the system load 600. Hereinafter, an operation of resetting the digital code DC by using the second comparator 527 will be described.

For example, the second comparator 527 may receive the second output voltage VOUT2. Thereafter, the second comparator 527 may compare the received second output voltage VOUT2 to a reset reference voltage and generate the reset signal RST corresponding to the comparison result. Herein, the reset reference voltage is a voltage as a reference to determine whether it is necessary to cut off power from the second power module 520. For example, the reset reference voltage may be set to have a voltage level of an input voltage, for example the second output voltage VOUT2, when the load current IL has a relatively low current level in a current range which the load current IL may have. In addition, the reset reference voltage may be lower than the second reference voltage VREF2.

The second comparator 527 may output the reset signal RST indicating a value obtained by subtracting an input voltage, for example the second output voltage VOUT2, from the reset reference voltage. When the load current IL of the system load 600 sharply decreases, a voltage drop of the input voltage decreases, and thus, the input voltage may have a relatively higher voltage level when compared to when the load current IL is higher. In other words, when the input voltage is higher than the reset reference voltage, for example the load current IL is low, the second comparator 527 may output the reset signal RST having a negative value.

The controller 523 may receive the reset signal RST and reset the digital code DC based on the reset signal RST. For example, the controller 523 may check the reset signal RST in a preset period, and when the reset signal RST has a negative value, the controller 523 may reset the digital code DC so that the digital code DC has the default code value. As another example, when the reset signal RST has a negative value, and an absolute value of the reset signal RST is greater than or equal to a preset value, the controller 523 may reset the digital code DC. A method, performed by the controller 523, of performing a reset operation based on the reset signal RST is not limited to the example described above, and the controller 523 may reset the digital code DC by various methods.

Because the digital code DC having the default code value corresponds to a state in which an additional current is not generated, the current generator 525 may suspend generation of a current when the reset digital code DC is received.

As described above, the power module 500 of FIG. 11 may immediately suspend supply of additional power when the load current IL sharply decreases due to an internal cause of the system load 600 or the like while supplying the additional power to the system load 600 by using the second power module 520, and thus, a fault of the system load 600 due to an overvoltage may be prevented.

Figure 12:
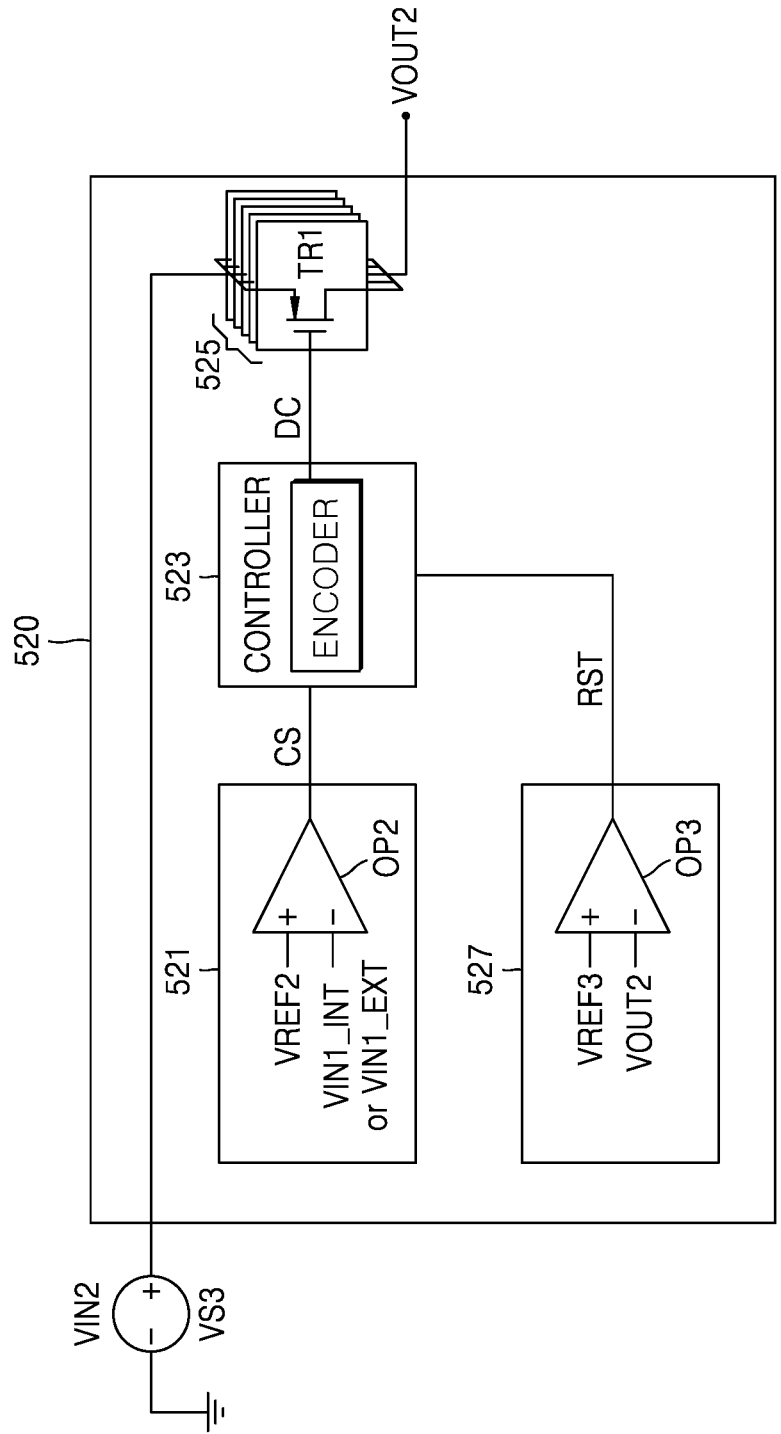
FIG. 12 is a detailed diagram of a second power module according to an embodiment.

FIG. 12 is a detailed diagram of a second power module according to an embodiment. FIG. 12 is a detailed diagram of the second power module 520 of FIG. 11. The second power module 520 is a modifiable embodiment of the second power module 220 of FIG. 1, and thus, a description made above with reference to FIGS. 1 to 10 is not repeated herein.

Referring to FIG. 12, the second comparator 527 in the second power module 520 may be implemented by a differential amplifier including a third OPAMP OP3. A third reference voltage VREF3 that is a reset reference voltage is input to a + terminal of the third OPAMP OP3, and a comparative voltage is input to a − terminal of the third OPAMP OP3. Herein, the comparative voltage is the second output voltage VOUT2 of the second power module 520. Although not shown in FIG. 12, the second comparator 527 may further include components such as a resistor besides the third OPAMP OP3.

The second comparator 527 may amplify a difference between the third reference voltage VREF3 and the second output voltage VOUT2 and output the amplified difference as the reset signal RST. The reset signal RST may have a positive voltage value when the third reference voltage VREF3 is higher than the second output voltage VOUT2, and have a negative voltage value when the third reference voltage VREF3 is lower than the second output voltage VOUT2. When the reset signal RST has a negative voltage value, it may be considered that the reset signal RST has an active level.

The controller 523 may receive the reset signal RST and reset the digital code DC based on the reset signal RST. For example, the controller 523 may reset the digital code DC when the reset signal RST has a negative voltage value. Then, the current generator 525 may suspend generation of a current upon receiving the reset digital code DC.

Although not shown in FIG. 12, the first comparator 521 in the second power module 520 may further include the multiplexer MUX of FIG. 10. For example, the multiplexer MUX in the first comparator 521 may receive the first external input voltage VIN1_EXT and the first internal input voltage VIN1_INT from the first power module 510 and output one of the input voltages according to a current power supply mode. The output voltage may be input to the − terminal of the second OPAMP OP2 in the first comparator 521.

Figure 13A:
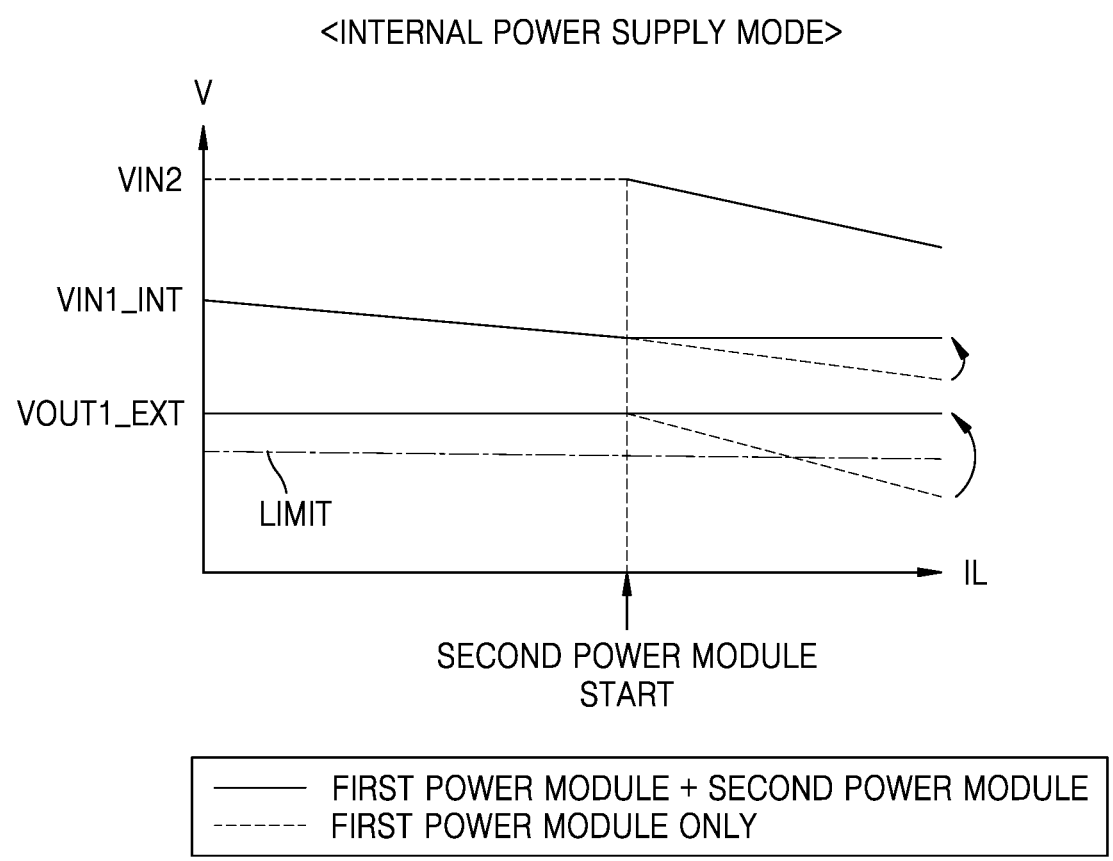
FIG. 13A is a current-voltage graph of an internal power supply mode according to on embodiment.
Figure 13B:
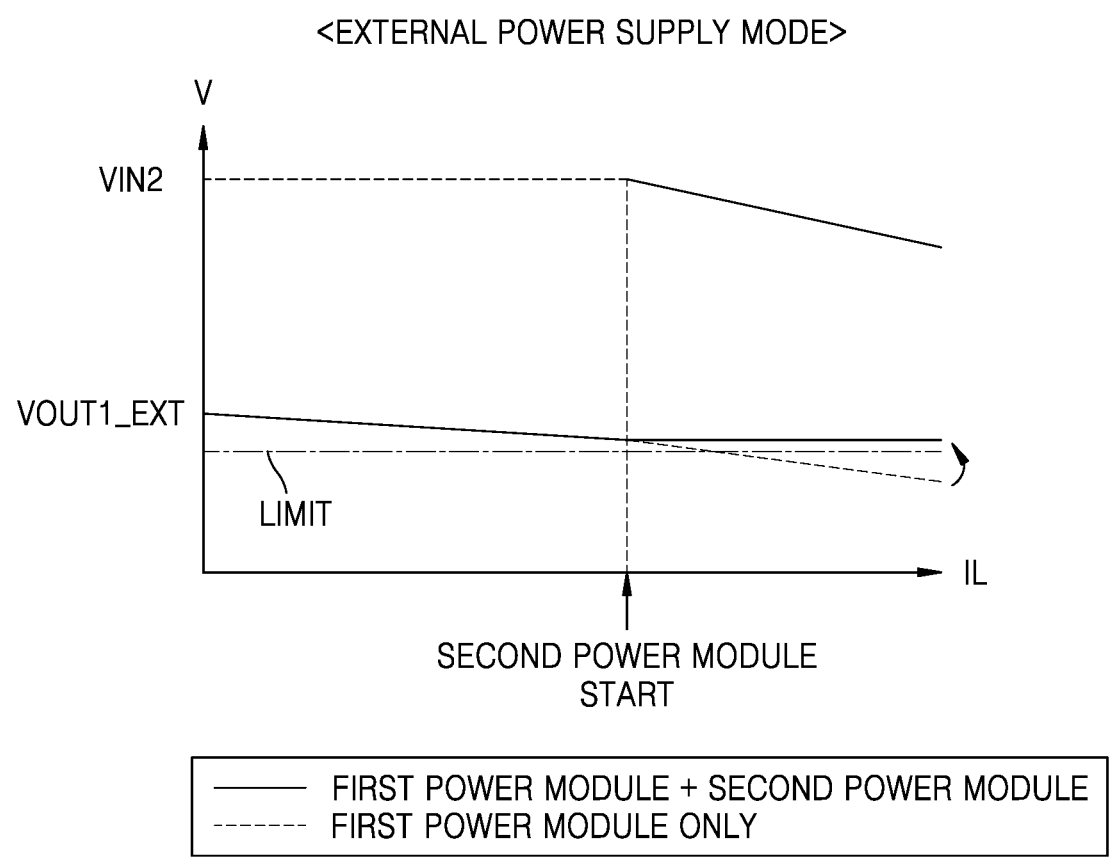
FIG. 13B is a current-voltage graph of on external power supply mode according to an embodiment.

FIG. 13A is a current-voltage graph of the internal power supply mode according to an embodiment. FIG. 13B is a current-voltage graph of the external power supply mode according to an embodiment. In FIGS. 13A and 13B, dashed lines indicate examples in which power is supplied to the system loads 300 and 600 by using only the first power modules 210 and 510, respectively, and solid lines indicate examples in which power is supplied to the system loads 300 and 600 by using both the first power modules 210 and 510 and the second power modules 220 and 520, respectively. In the graphs, the x-axis indicates a value of the load current IL of the system load 300 or 600, and the y-axis indicates values of the first internal input voltage VIN1_INT, the first internal output voltage VOUT1_INT, and the second input voltage VIN2.

Referring to FIG. 13A, in the internal power supply mode, the first internal input voltage VIN1_INT is applied to the first power module 210 or 510, and the first internal output voltage VOUT1_INT generated by the analog LDO regulator 215 or 515 in the first power module 210 or 510 is supplied to the system load 300 or 600.

When the load current IL of the system load 300 or 600 gradually increases, the first internal input voltage VIN1_INT decreases due to a voltage drop effect. When there is no additional power supplied from the second power module 220 or 520, the first internal input voltage VIN1_INT continues decreasing like the dashed line of FIG. 13A. Meanwhile, the first internal output voltage VOUT1_INT may maintain a constant voltage level up to a certain range by a characteristic of the analog LDO regulator 215 or 515 even when the load current IL increases. However, when the load current IL increases to the particular level or more, a transistor included in the analog LDO regulator 215 or 515 meets an operating limit, so that the first internal Output voltage VOUT1_INT also decreases like the dashed line of FIG. 13A. When the first internal output voltage VOUT1_INT continues decreasing, the first internal output voltage VOUT1_INT may reach a voltage level LIMIT insufficient for the system load 300 or 600 to operate. That is, the load current IL of the system load 300 or 600 may be limited to a range in which the first internal output voltage VOUT1_INT reaches the voltage level LIMIT.

The power module 200 or 500 according to embodiments may supply additional power by using the second power module 220 or 520 according to a circumstance in which the load current IL corresponds to a limit situation of an operation of the first power module 210 or 510, while supplying power by using the first power module 210 or 510. When the load current IL of the system load 300 or 600 gradually increases, the first internal input voltage VIN1_INT decreases due to a voltage drop effect. When the load current IL reaches the particular level, the second input voltage VIN2 may be applied to the second power module 220 or 520, and the second power module 220 or 520 may supply the second output voltage VOUT2.

Accordingly, even when the load current IL continues increasing, a voltage drop effect may be distributed to the second power module 220 or 520. As a result, the first internal input voltage VIN1_INT and the first internal output voltage VOUT1_INT may maintain a constant level from a power supply time point of the second power module 220 or 520 like the solid line of FIG. 13A. That is, when both the first power module 210 or 510 and the second power module 220 or 520 are used, a range of the load current IL of the system load 300 or 600 may be large.

Referring to FIG. 13B, in the external power supply mode, the first external input voltage VIN1_EXT is applied to the first power module 210 or 510, and the first external output voltage VOUT1_EXT is supplied to the system load 300 or 600. When the load current IL of the system load 300 or 600 gradually increases, the first external output voltage VOUT1_EXT decreases due to a voltage drop effect. When there is no additional power supplied from the second power module 220 or 520, the first external output voltage VOUT1_EXT continues decreasing like the dashed line of FIG. 13B. When the first external output voltage VOUT1_EXT continues decreasing, the first external output voltage VOUT1_EXT may reach the voltage level LIMIT insufficient for the system load 300 or 600 to operate. That is, the load current IL of the system load 300 or 600 may be limited to a range in which the first external output voltage VOUT1_EXT reaches the voltage level LIMIT.

When both the first power module 210 or 510 and the second power module 220 or 520 are used, a range of the load current IL of the system load 300 or 600 may be relatively large. For example, when the load current IL of the system load 300 or 600 gradually increases, the first external output voltage VOUT1_EXT decreases due to a voltage drop effect. When the load current IL reaches the particular level, the second input voltage VIN2 may be applied to the second power module 220 or 520, and the second power module 220 or 510 may supply the second output voltage VOUT2. Accordingly, even when the load current IL continues increasing, a voltage drop effect may be distributed to the second power module 220 or 520. As a result, the first external input voltage VOUT1_EXT may maintain a constant level from a power supply time point of the second power module 220 or 520 like the solid line of FIG. 13B. That is, when both the first power module 210 or 510 and the second power module 220 or 520 are used, a range of the load current IL of the system load 300 or 600 may be large.

Figure 14:
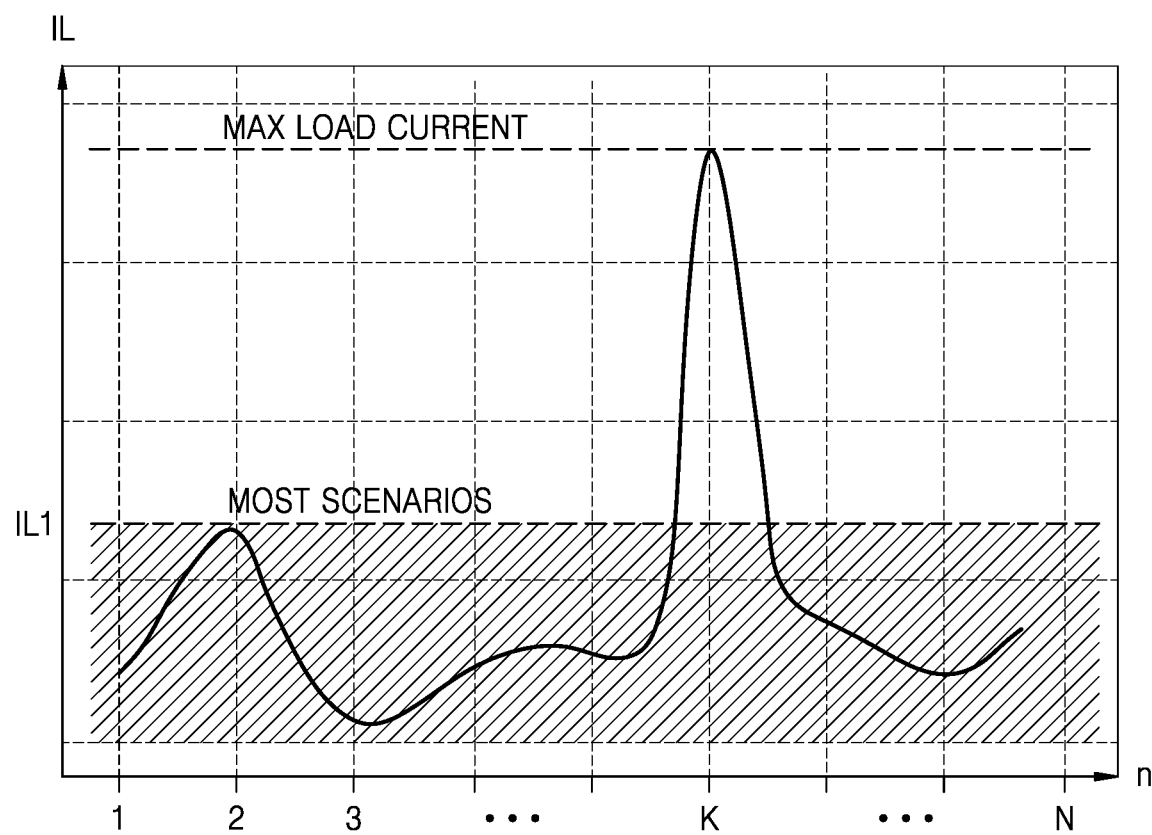
FIG. 14 is a graph showing a scenario-based load current according to an embodiment.

FIG. 14 is a graph showing a scenario-based load current according to an embodiment. In the graph of FIG. 14, the x-axis indicates numbers of scenarios of the system load 300 or 600, and the y-axis indicates a value of the load current IL of the system load 300 or 600.

Referring to FIG. 14, the system load 300 or 600 may operate according to various scenarios, and the load current IL may vary for each scenario. Where the system load 300 or 600 operates while changing a scenario in real-time, the load current IL may also vary in real-time.

Therefore, when only one power source is used, for example when only the first power module 210 or 510 is used, to supply stable power regardless of the load current IL varying in real-time, power is supposed to be supplied based on a scenario, for example a Kth scenario, in which the load current IL is maximum. In other words, power is supposed to be supplied by using the maximum level of an input voltage, for example the first internal input voltage VIN1_INT or the first internal output voltage VOUT1_INT, of the first power module 210 or 510.

Accordingly, power consumption of the power module 200 or 500 is represented by Equation 1 below.

$$Pn = V\text{IN,MAX} * IV\text{IN}1,$$

$$ILOAD\_n = IV\text{IN}1 \quad \text{Equation 1}$$

where Pn denotes power consumption of an nth scenario, VIN, MAX denotes an input voltage having the maximum level, ILOAD_N denotes a load current of the nth scenario and IVIN1 denotes an output current of the first power module 210 or 510.

Referring to FIG. 14, except for the Kth scenario, the load current IL of the other scenarios is lower than IL1. Therefore, the power module 200 or 500 according to embodiments may be implemented to supply power by using only the first power module 210 or 510 when the load current IL is lower than IL1, for example for most scenarios, and to supply power by using the first power module 210 or 510 and the second power module 220 or 520 when the load current IL is higher than IL1, for example for the scenario of the maximum load current. In this case, the first power module 210 or 510 may supply power by using an input voltage having a lower level than the maximum level, and the second power module 220 or 520 may supply power by using an input voltage having the maximum level.

Accordingly, power consumption in most scenarios of the power module 200 or 500 is represented by Equation 2 below.

$$Pn = V\text{IN,NORMAL} * IV\text{IN}1$$

$$ILOAD\_n = IV\text{IN}1 \quad \text{Equation 2}$$

where Pn denotes power consumption of the nth scenario, VIN,NORMAL denotes an input voltage having a lower level than the maximum level, IVIN1 denotes an output current of the first power module 210 or 510, and ILOAD_n denotes a load current of the nth scenario.

In addition, power consumption in the scenario of the maximum load current of the power module 200 or 500 is represented by Equation 3 below.

$$PK = (V\text{IN,NORMAL} * IV\text{IN}1) + (V\text{IN,MAX} * IV\text{IN}2),$$

$$ILOAD\_K = IV\text{IN}1 + IV\text{IN}2 \quad \text{Equation 3}$$

where PK denotes power consumption of the Kth scenario of the maximum load current, VIN,NORMAL denotes an input voltage having a lower level than the maximum level, VIN,MAX denotes an input voltage having the maximum level, IVIN1 denotes an output current of the first power module 210 or 510, IVIN2 denotes an output current of the second power module 220 or 520, and ILOAD_K denotes a load current of the Kth scenario.

When power consumption using only the first power module 210 or 510 is compared to power consumption using both the first power module 210 or 510 and the second power module 220 or 520, the power consumption of the latter is less than the power consumption of the former. For example, in most scenarios, using both the first power module 210 or 510 and the second power module 220 or 520 has current consumption lower by ILOAD_n*(VIN, MAX−VIN,NORMAL). In addition, in the scenario of the maximum load current, both the first power module 210 or 510 and the second power module 220 or 520 has current consumption lower by IVIN1*(VIN, MAX−VIN,NORMAL).

Figure 15:
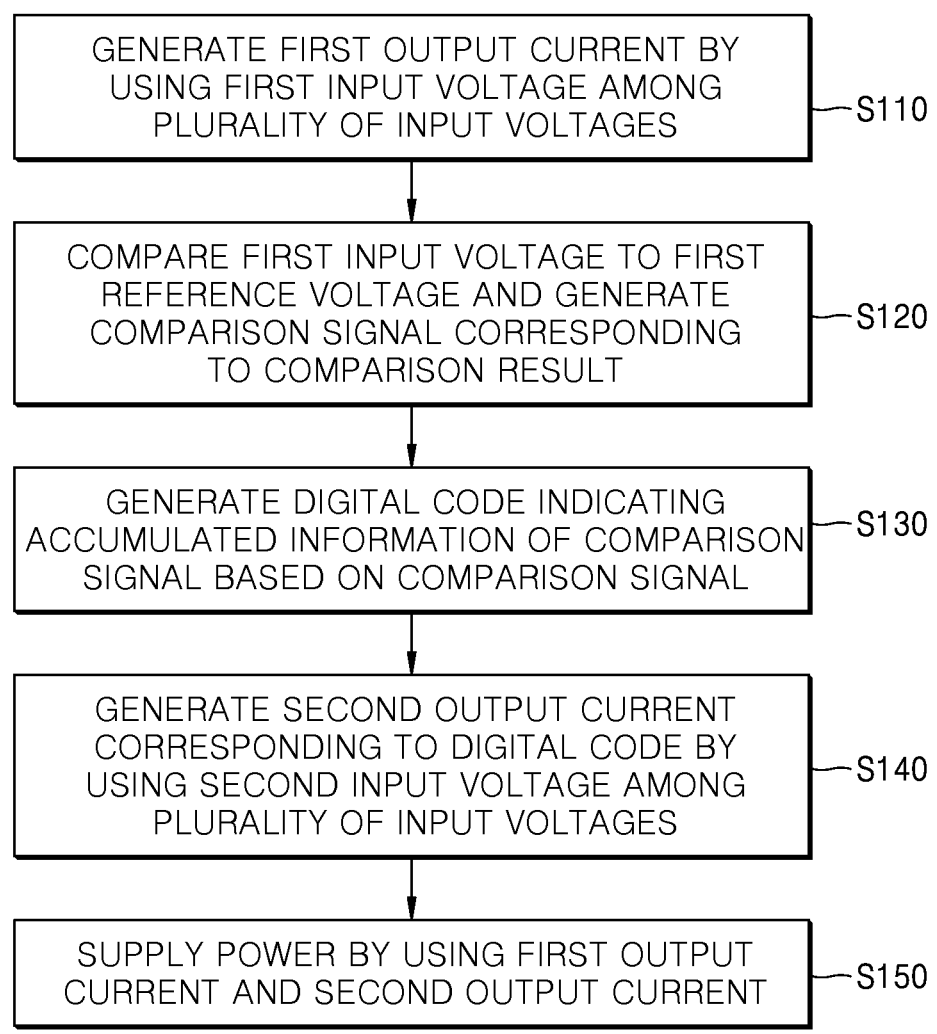
FIG. 15 is a flowchart of a power supply method according to an embodiment.

FIG. 15 is a flowchart of power supply method according to an embodiment. The method of FIG. 15 may be performed by the power module 200 of FIG. 1 or the power module 500 of FIG. 11.

Referring to FIG. 15, in operation S110, the power module 200 or 500 may generate a first output current by using a first input voltage among a plurality of input voltages supplied from the power management device 100 or 400. For example, the power module 200 or 500 may operate in the internal power supply mode in which an output voltage having a certain level is generated from a received input voltage by using a regulator, or operate in the external power supply mode in which an output voltage is generated from a received input voltage through a single line. The power module 200 or 500 may generate a first output current in the internal power supply mode or the external power supply mode.

In operation S120, the power module 200 or 500 may compare the first input voltage to a first reference voltage and generate a comparison signal corresponding to the comparison result. Herein, the first reference voltage may be a voltage used as a reference to determine whether it is necessary to additionally supply power. The comparison signal may have the first level when the first input voltages lower than the first reference voltage, and may have the second level when the first input voltage is higher than the first reference voltage.

In operation S130, the power module 200 or 500 may generate a digital code indicating accumulated information of the comparison signal based on the comparison signal. For example, the power module 200 or 500 may increase a code value of the digital code when the comparison signal has the first level, and decrease the code value of the digital code when the comparison signal has the second level. The power module 200 or 500 may generate the digital code in a preset period.

For example, when the comparison signal has the first level, the power module 200 or 500 may check a bit having a first value in the order from the LSB to the MSB among a plurality of bits included in the digital code and change the checked bit having the first value to a second value. On the contrary, when the comparison signal has the second level, the power module 200 or 500 may check a bit having the second value in the order from the MSB to the LSB and change the checked bit having the second value to the first value.

In operation S140, the power module 200 or 500 may generate a second output current corresponding to the digital code by using a second input voltage among the plurality of input voltages. In operation S150, the power module 200 or 500 may supply power by using the first output current and the second output current.

For example, the power module 200 or 500 may check a bit having the first value, for example 1, among the plurality of bits included in the digital code. In addition, the power module 200 or 500 may generate the second output current by driving a transistor corresponding to the bit having the first value among a plurality of transistors to be driven by the second input voltage.

In addition, the power module 200 or 500 may perform an additional operation. For example, the power module 200 or 500 may compare the first input voltage to a second reference voltage and generate a reset signal corresponding to the comparison result. Herein, the second reference voltage is a voltage as a reference to determine whether it is necessary to cut off power. Thereafter, the power module 200 or 500 may reset the digital code based on the reset signal.

Figure 16:
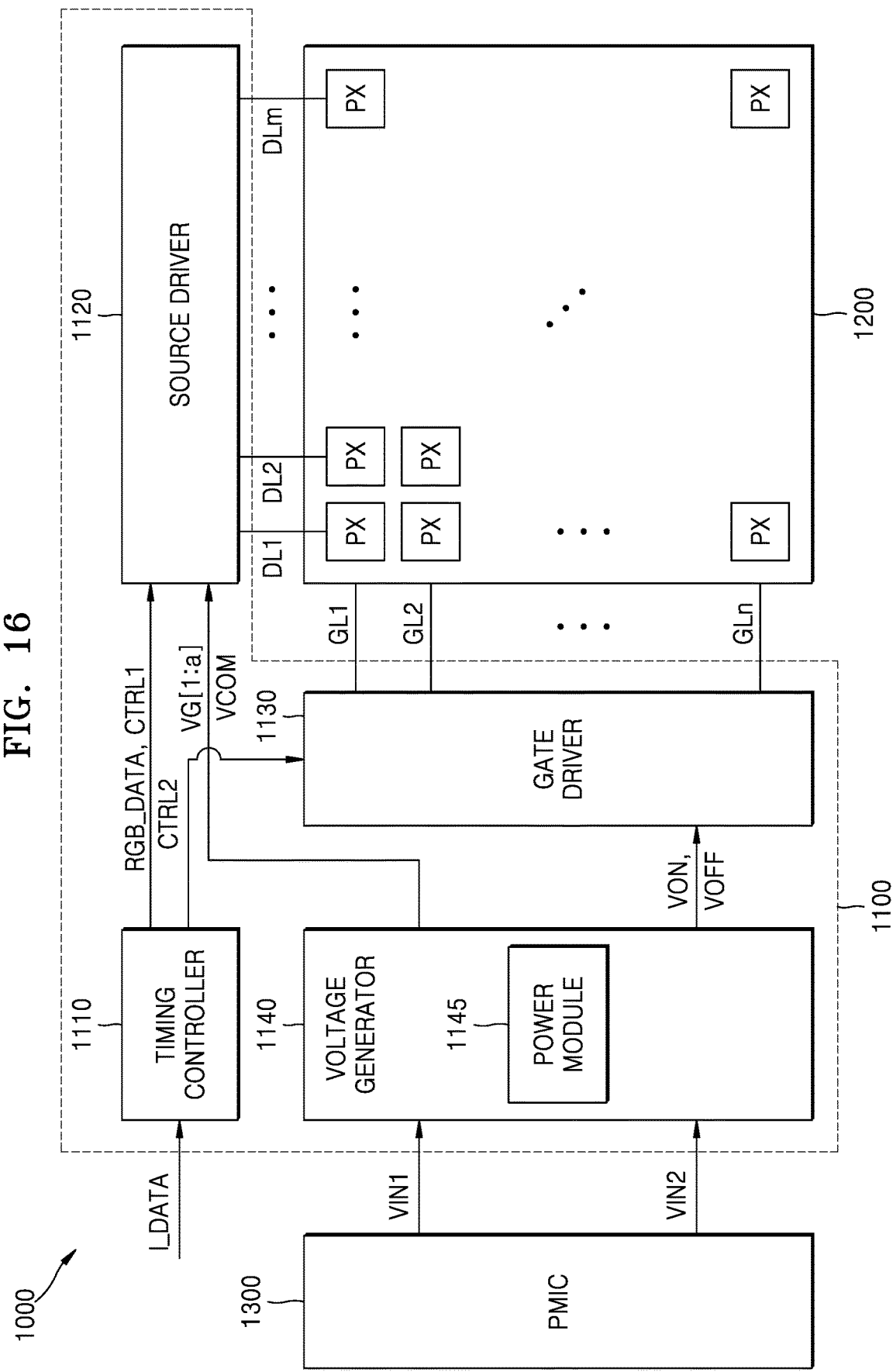
FIG. 16 is a block diagram of a display apparatus according to an embodiment.

FIG. 16 is a block diagram of a display apparatus 1000 according to an embodiment.

Referring to FIG. 16, the display apparatus 1000 may include a display driving circuit 1100, a display panel 1200, and a PMIC 1300.

The display panel 1400 is a display on which a real image is displayed and may be one of displays configured to receive an electrically transmitted image signal and display a two-dimensional image, such as an organic light emitting diode (OLED) display, a thin film transistor-liquid crystal display (TFT-LCD), a field emission display, and a plasma display panel (PDP). However, the display panel 1200 is not limited thereto, and the display panel 1200 may be implemented by a different type of flat display or a flexible display panel.

The display driving circuit 1100 may include a timing controller 1110, a source driver 1120, a gate driver 1130, and a voltage generator 1140. The timing controller 1110 may control a general operation of the display driving circuit 1100. For example, the timing controller 1110 may control components, e.g., the source driver 1120 and the gate driver 1130, of the display driving circuit 1100 so that image data 1_DATA received from an external device is displayed on the display panel 1200.

For example, the timing controller 1110 may generate, based on the received image data 1_DATA, pixel data RGB_DATA of which a format has been converted to meet an interface specification with the source driver 1120, and output the pixel data RGB_DATA to the source driver 1120. In addition, the timing controller 1110 may generate various kinds of control signals, e.g., first and second control signals CTRL1 and CTRL2 for controlling timings of the source driver 1120 and the gate driver 1130. The timing controller 1110 may output the first control signal CTRL1 to the source driver 1120 and output the second control signal CTRL2 to the gate driver 1130. Herein, the first control signal CTRL1 may include a polarity control signal, and the second control signal CTRL2 may include a gate timing signal.

The source driver 1120 may convert the pixel data RGB_DATA received from the timing controller 1110 into a plurality of image signals, e.g., a plurality of data voltages, and output the plurality of data voltages to the display panel 1200 (e.g., a plurality of pixels PX of the display panel 1200) through a plurality of data lines DL1 to DLm.

The gate driver 1130 is connected to a plurality of gate lines GL1 to GLn of the display panel 1200 and may sequentially drive the plurality of gate lines GL1 to GLn of the display panel 1200. The rate driver 1130 may sequentially provide a plurality of gate on signals having the active level e.g., logic high, to the plurality of gate lines GL1 to GLn under control of the timing controller 1110.

The voltage generator 1140 may generate various kinds of voltages needed to drive the display apparatus 1000. For example, the voltage generator 1140 may receive a power supply voltage from the outside. Thereafter, the voltage generator 1140 may generate a plurality of gradation voltages VG[1:$a$] and a common voltage VCOM and output the plurality of gradation voltages VG[1:$a$] and the common voltage VCOM to the source driver 1120. In addition, the voltage generator 1140 may generate a gate on voltage VON and a gate off voltage VOFF and output the gate on voltage VON and the gate off voltage VOFF to the gate driver 1130.

According to an embodiment, the generator 1140 may include a power module 1145. The power module 1145 of FIG. 16 may correspond to the power module 200 or 500 described with reference to FIGS. 1 to 15. The power module 1145 may receive the first input voltage VIN1 and/or the second input voltage VIN2 from the PMIC 1300 and supply power to as system load, for example the source driver 1120 or the gate driver 1130, by using the received voltage. An operation of the power module 1145 may be substantially the same as that of the power module 200 or 500 described above with reference to FIGS. 1 to 15, and thus, as duplicated description is omitted herein.

A configuration of the display driving circuit 1100 may include additional components. For example, the display driving circuit 1100 may be implemented to include a memory storing the received image data 1_DATA on a frame basis.

While embodiments have been particularly shown and described, it will be understood that various changes in form and details may be made therein without departing from the spirit and scope of the following claims.

What is claimed is:

1. An electronic device comprising:
a power management device configured to supply a plurality of input voltages;
a power module configured to generate an output voltage using at least one of the plurality of input voltages, and to output the generated output voltage; and
a system load configured to operate by receiving the output voltage, wherein the power module comprises:
a first power module configured to receive a first input voltage from the power management device, to generate a first output current using the first input voltage, and to provide the first output current to the system load; and
a second power module configured to:
receive a second input voltage from the power management device,
receive the first input voltage from the first power module, and
based on the first input voltage being lower than a first reference voltage, generate a second output current using the second input voltage, and provide the second output current to the system load.

2. The electronic device of claim 1, wherein the second power module is further configured to:
compare the first input voltage to the first reference voltage in a preset period to generate a first comparison result,
generate a digital code indicating accumulated information of the first comparison result, and
generate the second output current based on the generated digital code.

3. The electronic device of claim 2, wherein the second power module comprises:
a comparator configured to compare the first input voltage to the first reference voltage and output a comparison signal corresponding to the first comparison result;
a controller configured to increase or decrease a code value of the digital code based on the comparison signal and output the digital code; and
a current generator driven by the second input voltage, comprising a plurality of transistors respectively corresponding to a plurality of bits included in the digital code, and configured to generate the second output current by driving at least one transistor of the plurality of transistors according to the digital code.

4. The electronic device of claim 3, wherein the comparator is further configured to output the comparison signal at a first level when the first input voltage is lower than the first reference voltage, and to output the comparison signal at a second level when the first input voltage is higher than the first reference voltage, and
wherein the controller is further configured to increase the code value of the digital code when the comparison signal has the first level, and decrease the code value of the digital code when the comparison signal has the second level.

5. The electronic device of claim 4, wherein the controller is further configured to:
based on the comparison signal having the first level, check a bit having a first value in an order from a least significant bit (LSB) to a most significant bit (MSB) among the plurality of bits included in the digital code, and change a value of the bit having the first value to a second value and
based on the comparison signal having the second level, check a bit having the second value in an order from the MSB to the LSB and change a value of the bit having the second value to the first value.

6. The electronic device of claim 5, wherein the controller is further configured to not change the digital code based on the comparison signal having the second level, and a bit having the second value not being present in the order from the MSB to the LSB.

7. The electronic device of claim 3, wherein the current generator is further configured to check bits having a second value among the plurality of bits included in the digital code, and to drive transistors corresponding to the checked bits.

8. The electronic device of claim 3, wherein the second power module further comprises a second comparator configured to compare a second output voltage corresponding to the second output current to a second reference voltage to generate a second comparison result, and to output a reset signal corresponding to the second comparison result,
wherein the controller is further configured to reset the digital code based on the reset signal.

9. The electronic device of claim 8, wherein the second comparator is further configured to output the reset signal at an active level when the second output voltage is higher than the second reference voltage, and
wherein the controller is further configured to reset the digital code when the reset signal at the active level is confirmed.

10. The electronic device of claim 9, wherein the reset digital code has a default code value corresponding to a state in which the current generator does not generate a current.

11. The electronic device of claim 8, wherein at least one of the first reference voltage and the second reference voltage is set according to an operating state of the system load.

12. The electronic device of claim 1, wherein the first reference voltage has a minimum voltage level for driving the system load.

13. The electronic device of claim 1, wherein the first power module is further configured to operate in an internal power supply mode in which the first output current is generated by regulating the first input voltage, or in an external power supply mode in which a third output current is supplied by receiving a third input voltage from the power management device, and
wherein the second power module is further configured to select one of the first input voltage and the third input voltage according to a power supply mode of the first power module, and to generate the second output current based on the selected one of the first input voltage and the third input voltage being lower than the first reference voltage.

14. A power supply method of supplying an output current using a plurality of input voltages, the power supply method comprising:
generating a first output current using a first input voltage among the plurality of input voltages;
comparing the first input voltage to a first reference voltage to generate a first comparison result;
generating a comparison signal corresponding to the first comparison result;
generating a digital code indicating accumulated information of the comparison signal based on the comparison signal;
based on the digital code indicating that the first input voltage is higher than a first reference voltage, supplying power using the first output current without using a second output current; and
based on the digital code indicating that the first input voltage is lower than the first reference voltage, generating the second output current corresponding to the digital code using a second input voltage among the plurality of input voltages, and supplying power using the first output current and the second output current.

15. The power supply method of claim 14, wherein the comparison signal is generated at a first level based on the first input voltage being lower than the first reference voltage, and at a second level based on the first input voltage being higher than the first reference voltage, and wherein the generating of the digital code comprises:
increasing a code value of the digital code based on the comparison signal having the first level; and
decreasing the code value of the digital code based on the comparison signal having the second level.

16. The power supply method of claim 15, wherein the generating of the second output current comprises:
checking a bit having a first value among a plurality of bits included in the digital code; and
generating the second output current by driving a transistor corresponding to the bit having a first value among a plurality of transistors driven by the second input voltage.

17. The power supply method of claim 16, wherein the generating of the digital code further comprises:
based on the comparison signal having the first level, checking a bit having a first value in an order from a least significant bit (LSB) to a most significant bit (MSB) among the plurality of bits included in the digital code, and changing a value of the bit having the first value to a second value; and
based on the comparison signal having the second level, checking a bit having the second value in an order from the MSB to the LSB and changing a value of the bit having the second value to the first value.

18. The power supply method of claim 16, further comprising:
comparing a second output voltage corresponding to the second output current to a second reference voltage to generate a second comparison result;
generating a reset signal based on the second comparison result; and
resetting the digital code based on the reset signal.

19. A display apparatus comprising:
a power management device configured to supply a plurality of input voltages;
a display panel configured to display image data; and
a display driving circuit comprising a power module configured to supply power for driving the display apparatus, based on at least one input voltage received from the power management device,
wherein the power module is further configured to:
receive a first input voltage from the power management device,
generate a first output current using the first input voltage,
generate a second output current by receiving a second input voltage from the power management device based on the first input voltage being lower than a first reference voltage,
based on the first input voltage being higher than the first reference voltage, supply power for driving the display apparatus, using the first output current without using the second output current, and
based on the first input voltage being lower than the first reference voltage, supply the power for driving the display apparatus, using the first output current and the second output current,
wherein, the power supplied using the first output current and the second output current is greater than the power supplied using the first output current without using the second output current.

20. The display apparatus of claim 19, wherein the power module is further configured to:
compare the first input voltage to the first reference voltage in a preset period to generate a comparison result,
generate a digital code indicating accumulated information of the comparison result, and
generate the second output current based on the generated digital code.

* * * * *